(12) United States Patent
Tokunaga et al.

(10) Patent No.: US 10,596,451 B2
(45) Date of Patent: Mar. 24, 2020

(54) PROGRAM AND INFORMATION PROCESSING DEVICE

(71) Applicant: Sony Interactive Entertainment Inc., Tokyo (JP)

(72) Inventors: Nodoka Tokunaga, Tokyo (JP); Keigo Tamura, Tokyo (JP); Toshimasa Aoki, Tokyo (JP); Shoichi Ikenoue, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 15/502,907

(22) PCT Filed: Jun. 12, 2015

(86) PCT No.: PCT/JP2015/067075
§ 371 (c)(1),
(2) Date: Feb. 9, 2017

(87) PCT Pub. No.: WO2016/080005
PCT Pub. Date: May 26, 2016

(65) Prior Publication Data
US 2017/0232334 A1    Aug. 17, 2017

(30) Foreign Application Priority Data
Nov. 21, 2014   (JP) .................. 2014-236825

(51) Int. Cl.
*A63F 13/00* (2014.01)
*A63F 13/213* (2014.01)
(Continued)

(52) U.S. Cl.
CPC ............ *A63F 13/213* (2014.09); *A63F 13/32* (2014.09); *A63F 13/332* (2014.09);
(Continued)

(58) Field of Classification Search
CPC .. G07F 17/3262; G07F 17/3213; A63F 13/32; A63F 13/332; A63F 13/335
See application file for complete search history.

(56) References Cited

U.S. PATENT DOCUMENTS 6,139,432 A    10/2000  Watanabe
6,835,137 B1   12/2004  Nakamura
(Continued)

FOREIGN PATENT DOCUMENTS

JP    1999300033 A    11/1999
JP    2005230056 A     9/2005
(Continued)

OTHER PUBLICATIONS

International Preliminary Report on Patentability for corresponding PCT Application No. PCT/JP2015/067075, 16 pages, dated Jun. 1, 2017.
(Continued)

*Primary Examiner* — Omkar A Deodhar
*Assistant Examiner* — Eric M Thomas
(74) *Attorney, Agent, or Firm* — Matthew B. Dernier, Esq.

(57) ABSTRACT

A replay data acquisition section acquires replay data for reproducing a play status of a game. A replay image generation section generates a replay image of a game scene on the basis of the acquired replay data. A user determination section determines a user to be included in a combined image. A user image acquisition section acquires a user image obtained by imaging the determined user. A combination processing section generates the combined image by combining the acquired user image with the replay image.

5 Claims, 14 Drawing Sheets

(51) Int. Cl.
    *A63F 13/655*     (2014.01)
    *A63F 13/497*     (2014.01)
    *A63F 13/812*     (2014.01)
    *A63F 13/843*     (2014.01)
    *A63F 13/32*     (2014.01)
    *A63F 13/332*     (2014.01)
    *A63F 13/335*     (2014.01)
    *A63F 13/53*     (2014.01)

(52) U.S. Cl.
    CPC .......... *A63F 13/335* (2014.09); *A63F 13/497* (2014.09); *A63F 13/655* (2014.09); *A63F 13/812* (2014.09); *A63F 13/843* (2014.09); *A63F 13/53* (2014.09)

(56) References Cited

U.S. PATENT DOCUMENTS

| | | | |
|---|---|---|---|
| 9,491,430 B2 | 11/2016 | Maeda | |
| 2001/0049890 A1* | 12/2001 | Hirsch | A43B 3/0005 36/132 |
| 2002/0082082 A1* | 6/2002 | Stamper | A63F 13/02 463/32 |
| 2002/0154214 A1* | 10/2002 | Scallie | G02B 27/017 348/51 |
| 2006/0025229 A1* | 2/2006 | Mahajan | A63B 24/0003 473/131 |
| 2007/0279427 A1* | 12/2007 | Marks | H04N 5/2226 345/581 |
| 2008/0227542 A1 | 9/2008 | Yoshizawa | |
| 2010/0167819 A1* | 7/2010 | Schell | A63F 13/10 463/36 |
| 2012/0014658 A1 | 1/2012 | Suzuki | |
| 2012/0218266 A1 | 8/2012 | Maeda | |
| 2012/0295705 A1 | 11/2012 | Hanawa | |
| 2013/0053190 A1* | 2/2013 | Mettler | G09B 19/0038 473/463 |
| 2015/0046375 A1* | 2/2015 | Mandel | G06T 13/80 706/11 |

FOREIGN PATENT DOCUMENTS

| | | |
|---|---|---|
| JP | 2008178596 A | 8/2008 |
| JP | 2009147651 A | 7/2009 |
| JP | 2010214028 A | 9/2010 |
| JP | 2012174237 A | 9/2012 |
| JP | 2012239719 A | 12/2012 |

OTHER PUBLICATIONS

Extended European Search Report for corresponding EP Application No. 15861437.0, 8 pages, dated Feb. 9, 2018.
International Search Report for corresponding PCT Application No. PCT/JP2015/067075, 4 pages, dated Sep. 1, 2015.
Notification for Reason for Refusal for corresponding JP Application No. 2016-560073, 7 pages, dated Jul. 31, 2018.

* cited by examiner

FIG.2
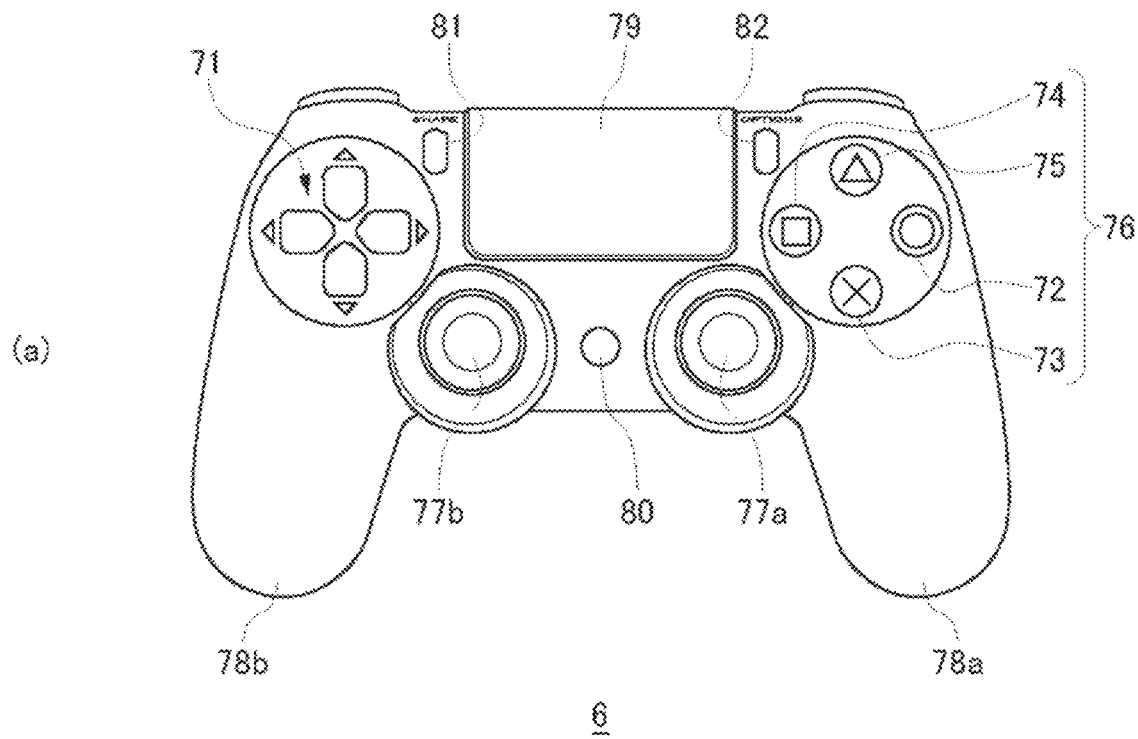
(a)
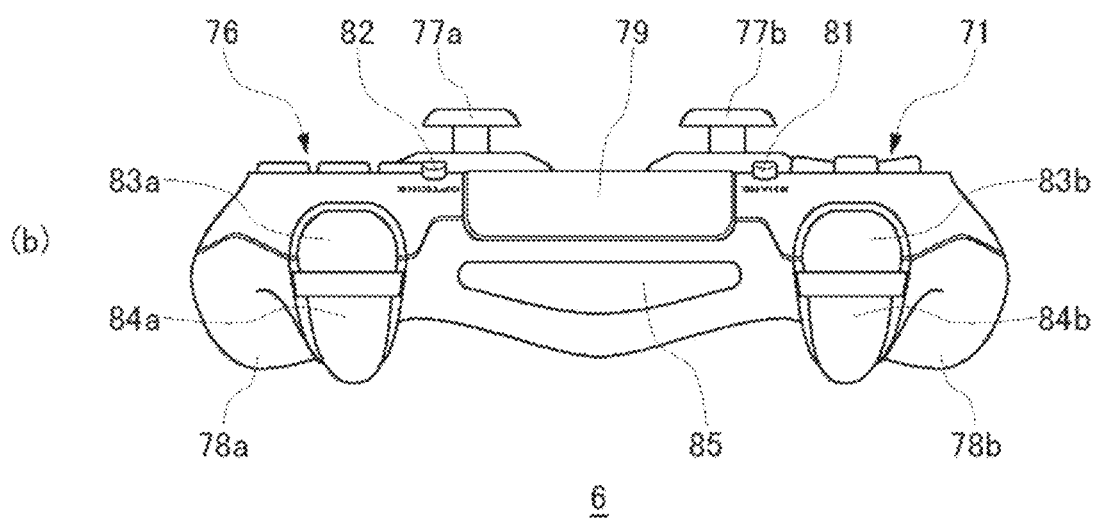
(b)

FIG. 7

| GOAL EVENT | | |
|---|---|---|
| REPLAY IMAGE | GAME OBJECT | TYPE INFORMATION |
| 1 | PLAYER WHO HAS MADE A SHOOT | 2 |
| 2 | PLAYER WHO HAS MADE A SHOOT | 2 |
| 3 | GOALKEEPER | 1 |

| GOAL EVENT ||
|---|---|
| PRIORITY ORDER | GAME OBJECT |
| 1 | PLAYER WHO HAS MADE A SHOOT |
| 2 | PLAYER WHO HAS MADE AN ASSIST |
| 3 | GOALKEEPER |

172

PROGRAM AND INFORMATION PROCESSING DEVICE

TECHNICAL FIELD

The present invention relates to a technology for editing a game scene.

BACKGROUND ART

A game program has a "replay function" of storing replay data indicative of a user's play status and reproducing a game scene of an event generated during a game as a replay image. A technology proposed by Patent Literature 1 proposes a technology for generating a reproduction image by combining the replay image with a captured image indicating a user playing the game.

CITATION LIST

Patent Literature

[PTL 1] U.S. Patent Application Publication No. 2012/14658

SUMMARY

Technical Problem

When a game scene of a generated event is combined with an image obtained by imaging the appearance of a playing user at the time of event generation, as disclosed in PTL 1, a viewer of the reproduction image can not only replay the game but also feel the atmosphere in which the playing user is enjoying and enthusiastic about the game. The inventors of the present invention have improved the technology disclosed in PTL 1 and realized a technology for generating a reproduction image that produces higher realistic sensation.

An object of the present invention is to provide a technology for combining a captured image of a user with a game image, such as a play image or replay image of a game scene.

Solution to Problem

In order to solve the above problem, according to a mode of the present invention, there is provided a program that causes a computer to implement a function for generating a game image, a function for determining a user to be included in a combined image on the basis of a play status in a game scene, a function for acquiring a user image obtained by imaging the determined user, and a function for generating the combined image by combining the acquired user image with the game image.

According to another mode of the present invention, there is provided an information processing device including an image generation section, a user determination section, a user image acquisition section, and a combination processing section. The image generation section generates a game image. The user determination section determines a user to be included in a combined image on the basis of a play status in a game scene. The user image acquisition section acquires a user image obtained by imaging the determined user. The combination processing section generates the combined image by combining the acquired user image with the game image.

It is to be noted that arbitrary combinations of the above constituent elements as well as modes obtained by converting expressions of the present invention between a method, a device, a system, a recording medium, a computer program, and the like are also effective as modes of the present invention.

Advantageous Effect of Invention

An information processing technology provided by the present invention makes it possible to effectively combine a game image with a captured image of a user.

BRIEF DESCRIPTION OF DRAWINGS

FIG. 2 is a diagram illustrating an external configuration of an input device.

FIG. 7 is a diagram illustrating an example of event information about a goal event.

FIG. 13 is a diagram illustrating priority information about a goal event.

DESCRIPTION OF EMBODIMENT

Figure 1:
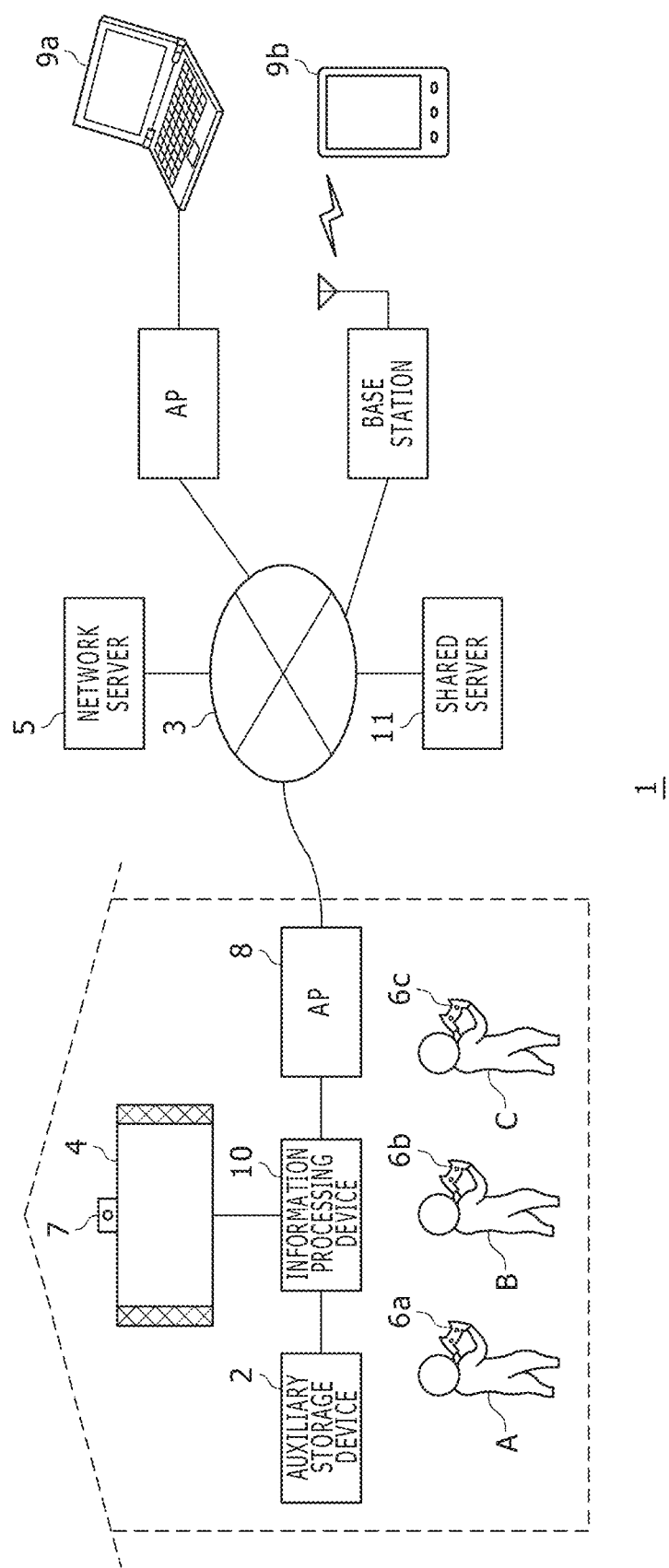
FIG. 1 is a diagram illustrating an information processing system according to an embodiment of the present invention.

FIG. 1 illustrates an information processing system 1 according to an embodiment of the present invention. The information processing system 1 realizes an environment in which a user as a distributor performs live distribution of a game image during play and a separate viewing user views the game image. The information processing system 1 includes an information processing device 10 used by the distributing user, a network server 5, a shared server 11, and various kinds of terminal devices 9a and 9b. The information processing device 10, the network server 5, the shared server 11, and the terminal devices 9a and 9b are connected to one another via a network 3 such as the Internet, a local area network (LAN), a telephone network, or the like. An access point (hereinafter referred to as the "AP") 8 has functions of a wireless access point and a router. The information processing device 10 is connected to the AP 8 via radio or wire to be communicatably connected to the network server 5 and the shared server 11 on the network 3.

The information processing device 10 is connected to an input device 6 operated by the user by radio or by wire. The input device 6 outputs information about an operation of the user to the information processing device 10. Upon receipt of the operation information from the input device 6, the information processing device 10 reflects the operation information in processing of system software or game software, and outputs a result of the processing from an output device 4. In the information processing system 1, the information processing device 10 may be a game device that executes a game program, and the input device 6 may be a device such as a game controller or the like that supplies the user operation information to the information processing device 10. The information processing device 10 performs streaming distribution of game image data during play to the terminal devices 9a and 9b. Hence, the information processing system 1 in the embodiment operates as a game image distribution system.

The network server 5 provides game network service to the user of the information processing device 10. The network server 5 manages a network account identifying the user. The user signs in to the network service provided by the network server 5 using the network account. When the user signs in to the network service from the information processing device 10, the user can register, in the network server 5, the save data of the game as well as a virtual prize (trophy) obtained during a game play.

In the present example, three users A, B, and C are playing the game together on the information processing device 10. The user A operates an input device 6a. The user B operates an input device 6b. The user C operates an input device 6c. The output device 4 displays a game image during the play. This game image is distributed to the terminal devices 9a and 9b of viewing users through the shared server 11. FIG. 1 illustrates a state in which the terminal device 9a is a personal computer and is connected to the network 3 via an AP, and the terminal device 9b is a mobile apparatus such as a smartphone or the like and is connected to the network 3 via a base station. However, the viewing users may receive the distributed game image by terminal devices identical to the information processing device 10. Incidentally, in another example, the information processing device 10 and the terminal devices may be connected to each other by peer to peer (P2P) to transmit and receive data to and from each other. The terminals of the viewing users will hereinafter be referred to collectively as "terminal devices 9" unless particularly distinguished from each other.

An auxiliary storage device 2 is a mass storage device such as a hard disk drive (HDD) or a flash memory. The auxiliary storage device 2 may be an external storage device connected to the information processing device 10 by a universal serial bus (USB) or the like, or may be an internal storage device. The output device 4 may be a television set including a display for outputting an image and a speaker for outputting a sound, or may be a computer display. The output device 4 may be connected to the information processing device 10 by a wired cable, or may be connected to the information processing device 10 by radio.

The input device 6 includes a plurality of input units such as a plurality of push type operating buttons, an analog stick capable of inputting an analog quantity, a rotary button, and the like. A camera 7 as an imaging device is disposed in the vicinity of the output device 4 to image a space around the output device 4. FIG. 1 illustrates an example in which the camera 7 is attached to an upper portion of the output device 4. However, the camera 7 may be disposed on a side of the output device 4. In either case, the camera 7 is disposed in such a position as to be able to image the users A, B, and C playing the game in front of the output device 4. The camera 7 may be a stereo camera.

In the embodiment, the game program has a "replay function" of storing replay data indicative of a user's play status and reproducing a game scene of an event generated during a game as a replay image. For example, a goal scene in a soccer game is a typical event. After the end of a match, the game program generates and displays a plurality of replay images that reproduce a three-dimensional virtual space of the goal scene by varying the viewpoint and line-of-sight of a virtual camera. In this instance, the game program combines the replay images with an image that is captured by the camera 7 to display a user playing the game, and the information processing device 10 distributes a reproduction image, which represents the result of combination, to the terminal devices 9 through the shared server 11.

As described above, the embodiment distributes, after the end of a play, not only the game image (replay image) of an edited highlight scene but also a captured image of the user playing a highlight scene. However, even during a play, the captured image obtained by photographing the user and the game image used by the playing user may be both distributed in real time to the terminal devices 9 of the viewing users. It should be noted that a captured image distributed during a play in the highlight scene may be different from a captured image included in the edited highlight scene. For example, even if a captured image of the user B is distributed during a play in a certain highlight scene, a captured image of the user A may be included in the reproduction image.

A button configuration of the input device 6 will now be described.

Configuration of Upper Surface Portion

FIG. 2(a) illustrates an external configuration of an upper surface of the input device. The user operates the input device 6 while holding a left grip portion 78b with a left hand and holding a right grip portion 78a with a right hand. The upper surface of a casing of the input device 6 is provided with direction keys 71, analog sticks 77a and 77b, and four kinds of operating buttons 76 as input units. A touch pad 79 is provided in a flat region between the direction keys 71 and the operating buttons 76 on the upper surface of the casing. The touch pad 79 also functions as a depression type button that sinks downward when pressed by the user and returns to an original position when the user's hand is released.

A function button 80 is provided between the two analog sticks 77a and 77b. The function button 80 is used to turn on power to the input device 6 and simultaneously activate a communication function that connects the input device 6 and the information processing device 10 to each other. After the input device 6 is connected to the information processing device 10, the function button 80 is also used to display a home screen on the information processing device 10.

A SHARE button 81 is provided between the touch pad 79 and the direction keys 71. The SHARE button 81 is used to input an instruction from the user to an operating system (OS) or system software in the information processing device 10. An OPTIONS button 82 is provided between the touch pad 79 and the operating buttons 76. The OPTIONS button 82 is used to input an instruction from the user to an application (game) executed in the information processing device 10. The SHARE button 81 and the OPTIONS button 82 may each be formed as a push type button.

Configuration of Side Surface Portion on Back Side

FIG. 2(b) illustrates an external configuration of a side surface on a back side of the input device. On an upper side of the side surface on the back side of the casing of the input device 6, the touch pad 79 is extended from the upper surface of the casing. A horizontally long light emitting portion 85 is provided on a lower side of the side surface on the back side of the casing. The light emitting portion 85 has a red (R) light emitting diode (LED), a green (G) LED, and a blue (B) LED. The light emitting portion 85 illuminates according to light emitting color information transmitted from the information processing device 10. When the three input devices 6a, 6b, and 6c are used as illustrated in FIG. 1, the information processing device 10 may set different colors, or blue, red, and green, as respective lighting colors of the light emitting portions 85 of the input devices 6a, 6b, and 6c so that the users A, B, and C can distinguish the respective input devices 6. Each user can thereby recognize the input device 6 that the user is using by the lighting color of the light emitting portion 85. A possibility of the user mistaking the input device 6 is therefore reduced.

On the side surface on the back side of the casing, an upper side button 83a, a lower side button 84a, an upper side button 83b, and a lower side button 84b are disposed at left and right positions symmetric in a longitudinal direction. The upper side button 83a and the lower side button 84a are operated by an index finger and a middle finger, respectively, of the right hand of the user. The upper side button 83b and the lower side button 84b are operated by an index finger and a middle finger, respectively, of the left hand of the user. As illustrated in the figure, the light emitting portion 85 is disposed between a line of the upper side button 83a and the lower side button 84a on the right side and a line of the upper side button 83b and the lower side button 84b on the left side. Therefore, the light emitting portion 85 is not hidden by the index fingers or the middle fingers operating the respective buttons. The camera 7 can thus image the illuminating light emitting portion 85 ideally. The upper side button 83 may be configured as a push type button. The lower side button 84 may be configured as a rotatably supported trigger type button.

Figure 3:
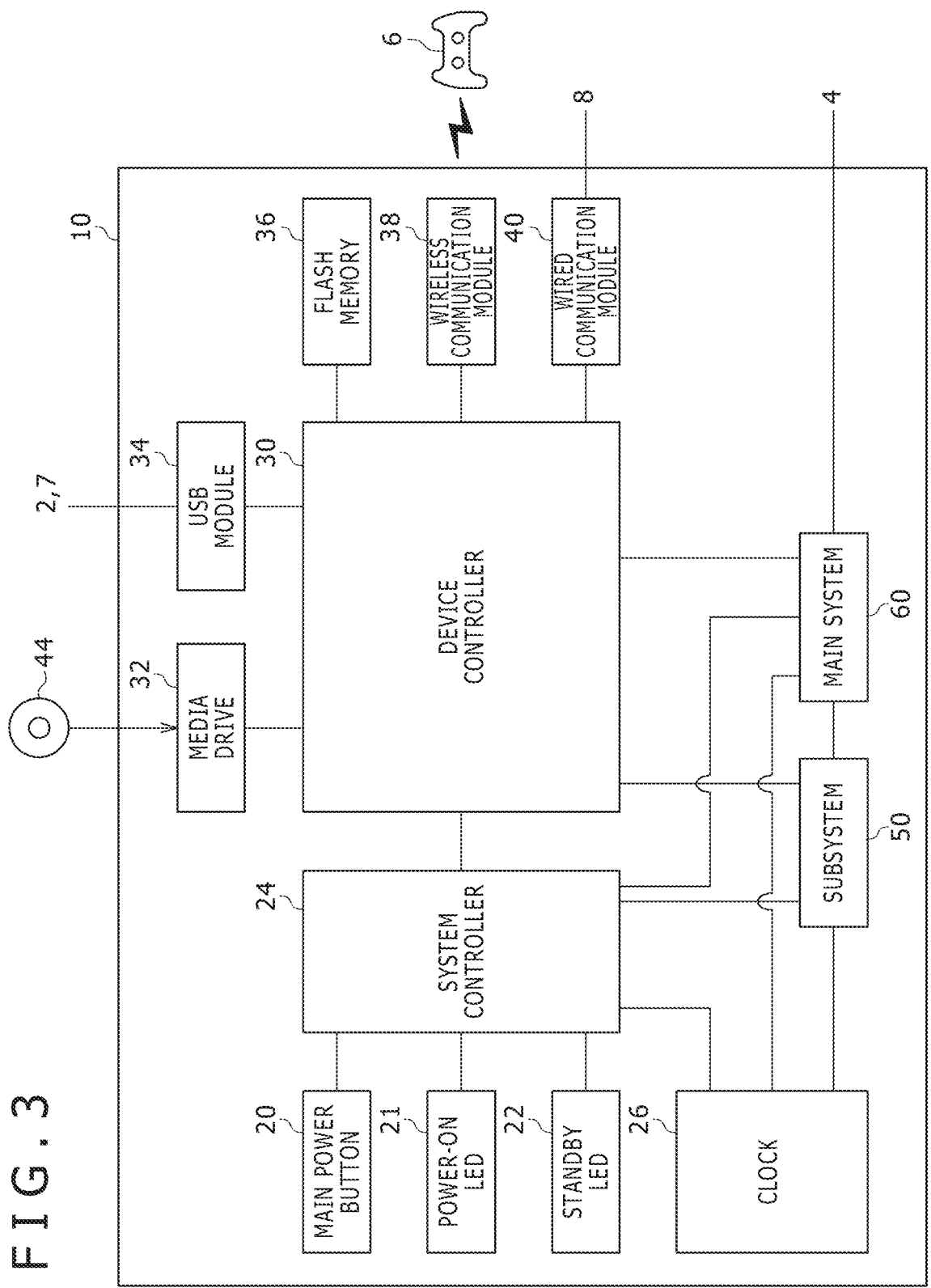
FIG. 3 is a diagram illustrating functional blocks of an information processing device.

FIG. 3 illustrates functional blocks of the information processing device 10. The information processing device 10 includes a main power button 20, a power-on LED 21, a standby LED 22, a system controller 24, a clock 26, a device controller 30, a media drive 32, a USB module 34, a flash memory 36, a wireless communication module 38, a wire communication module 40, a subsystem 50, and a main system 60.

The main system 60 includes a main central processing unit (CPU), a memory as a main storage device, a memory controller, a graphics processing unit (GPU), and the like. The GPU is used mainly for arithmetic processing of the game program. The main CPU has a function of starting the OS and executing an application installed in the auxiliary storage device 2 under an environment provided by the OS. The subsystem 50 includes a sub-CPU, a memory as a main storage device, a memory controller, and the like. The subsystem 50 does not include a GPU.

The main CPU has a function of executing the game program installed in the auxiliary storage device 2 or on a read only memory (ROM) medium 44, whereas the sub-CPU does not have such a function. However, the sub-CPU has a function of accessing the auxiliary storage device 2 and a function of transmitting and receiving data to and from the network server 5. The sub-CPU is configured to have only such limited processing functions, and is therefore able to operate with lower power consumption than the main CPU. These functions of the sub-CPU are performed when the main CPU is in a standby state. Because the subsystem 50 is operating during the standby period of the main system 60, the information processing device 10 according to the embodiment always remains signed in to the network service provided by the network server 5.

The main power button 20 is an input section to which an operating input from the user is performed. The main power button 20 is disposed on a front surface of a casing of the information processing device 10. The main power button 20 is operated to turn on or off the supply of power to the main system 60 of the information processing device 10. The power-on LED 21 is lit when the main power button 20 is turned on. The standby LED 22 is lit when the main power button 20 is turned off. The system controller 24 detects the depression of the main power button 20 by the user.

The clock 26 is a real-time clock. The clock 26 generates present date and time information, and supplies the present date and time information to the system controller 24, the subsystem 50, and the main system 60.

The device controller 30 is configured as a large-scale integrated circuit (LSI) that transfers information between devices like a Southbridge. As illustrated in the figure, the device controller 30 is connected to devices such as the system controller 24, the media drive 32, the USB module 34, the flash memory 36, the wireless communication module 38, the wire communication module 40, the subsystem 50, and the main system 60. The device controller 30 accommodates differences between electrical characteristics of the respective devices and differences between data transfer rates, and controls data transfer timing.

The media drive 32 is a drive device that is loaded with and drives the ROM medium 44 on which application software, such as a game, and license information are recorded, and reads a program, data, and the like from the ROM medium 44. The ROM medium 44 is a read-only recording medium such as an optical disk, a magneto-optical disk, or a Blu-ray disk.

The USB module 34 is a module connected to an external device by a USB cable. The USB module 34 may be connected to the auxiliary storage device 2 and the camera 7 by a USB cable. The flash memory 36 is an auxiliary storage device forming an internal storage. The wireless communication module 38 performs wireless communication, for example, with the input device 6 under a communication protocol such as a Bluetooth (registered trademark) protocol or an Institute of Electrical and Electronic Engineers 802.11 (IEEE802.11) protocol. Incidentally, the wireless communication module 38 may support a third-generation (3rd Generation) digital mobile telephone system compliant with an International Mobile Telecommunication 2000 (IMT-2000) standard defined by the International Telecommunication Union (ITU), and may further support a digital mobile telephone system of another generation. The wire communication module 40 performs wire communication with an external device. The wire communication module 40 is connected to the network 3, for example, through the AP 8.

Figure 4:
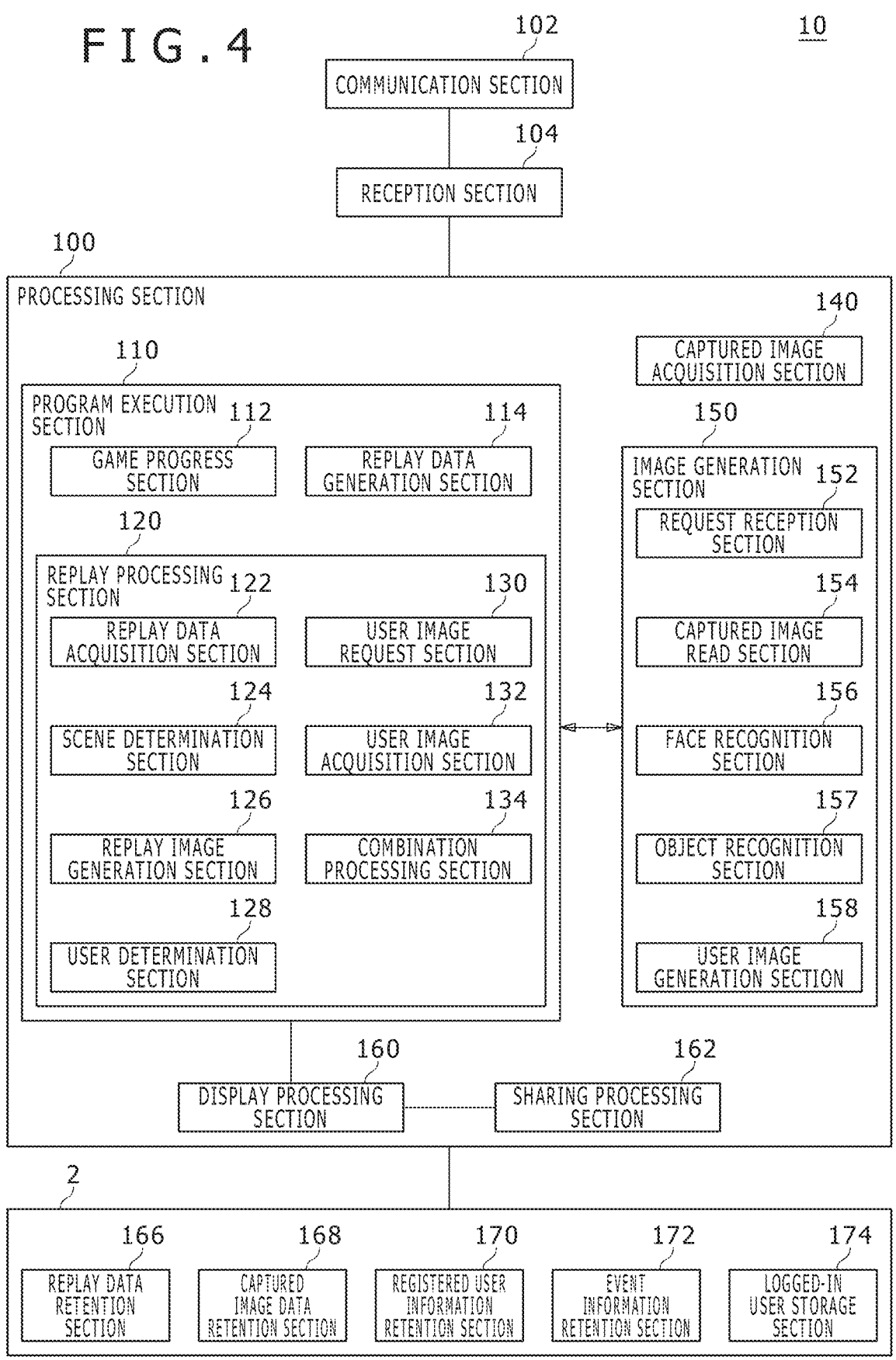
FIG. 4 is a diagram illustrating a configuration for processing a replay image of a game.

FIG. 4 illustrates a configuration of the information processing device 10 that processes a replay image of a game. The information processing device 10 includes a processing section 100, a communication section 102, and a reception section 104. The processing section 100 includes a program execution section 110, a captured image acquisition section 140, an image generation section 150, a display processing section 160, and a sharing processing section 162. Referring to FIG. 4, elements indicated as functional blocks for performing various processing operations can be implemented by hardware such as a circuit block, a memory, or another LSI or implemented by software such as a program loaded into the memory. Thus, it will be understood by those skilled in the art that the functional blocks may be variously implemented by hardware only, by software only, or by a combination of hardware and software. The method of implementing the functional blocks is not restrictively limited.

The program execution section 110 executes the game program and implements the functions of a game progress section 112, a replay data generation section 114, and a replay processing section 120. The replay processing section 120 includes a replay data acquisition section 122, a scene determination section 124, a replay image generation section 126, a user determination section 128, a user image request section 130, a user image acquisition section 132, and a combination processing section 134. Functions exercised as described here are implemented by executing the game program and configured, for example, by the game program or the graphics processing unit (GPU).

The image generation section 150 includes a request reception section 152, a captured image read section 154, a face recognition section 156, an object recognition section 157, and a user image generation section 158. The face recognition section 156 is implemented by a face recognition engine mounted in the information processing device 10.

The communication section 102 receives operation information from the input device 6 and distributes a game image generated by the processing section 100 to another terminal device 9 through the shared server 11. The processing section 100 has a function of generating a play image indicative of a user's real-time play status and a replay image reproducing a past play status. A user of a terminal device 9 can access the shared server 11 connected to the network 3 and view a game image distributed from the information processing device 10. It is assumed that the communication section 102 has the functions of the wireless communication module 38 and wire communication module 40 illustrated in FIG. 3. The communication section 102 may directly distribute content to another terminal device 9.

The reception section 104 is disposed between the communication section 102 and the processing section 100 to transmit data or information between the communication section 102 and the processing section 100. Upon receipt of operation information from the input device 6 through the communication section 102, the reception section 104 supplies the operation information to the processing section 100. Further, the reception section 104 receives a game image from the program execution section 110 and forwards the game image to the communication section 102.

A registered user information retention section 170 is formed in a storage region of the auxiliary storage device 2 in order to retain various information about a user registered in the information processing device 10. More specifically, the registered user information retention section 170 retains various items of registered user information in association with a user account. The retained registered user information includes a log-in pass code, a sign-in identification (ID) for signing in to the network server 5, a network account, a user's on-line ID (a user name on the network), and a user icon for expressing a user. Further, the registered user information retention section 170 retains, as the registered user information, face identification data in association with a user account. The face identification data is used for face recognition processing.

The face identification data, which is face image feature amount data on a registered user, may be formed of face image data itself. The face identification data is handled as a comparison target during face recognition processing by the face recognition section 156 and generated based on a face recognition algorithm employed by the face recognition section 156. For example, the face identification data may be obtained by extracting, as features, the relative positions and sizes of parts of a face and the shapes of eyes, a nose, cheekbones, and a chin. Further, the face identification data may be obtained by extracting, as difference data, the difference from standard data about face images. The type of face identification data to be extracted is determined by the employed face recognition algorithm. In the embodiment, the face recognition section 156 employs a well-known face recognition algorithm.

The information processing device 10 according to the embodiment accepts an operation performed on the input device 6 on condition that a user has logged in. In the example of FIG. 1, therefore, the users A, B and C have logged in to the information processing device 10. A logged-in user storage section 174 is formed in the storage region of the auxiliary storage device 2 in order to store user information about a user who has logged in to the information processing device 10. As mentioned earlier, the light emitting portion 85 of a currently used input device 6 emits light whose color is preset by the information processing device 10. The logged-in user storage section 174 stores a logged-in user, the identification information about the input device 6, and the color of light emitted from the input device 6 in association with each other. When, in the embodiment, the light emitting portions 85 of the input devices 6a, 6b, and 6c are emitting blue light, red light, and green light, respectively, the logged-in user storage section 174 stores the user account of the user A, the identification information about the input device 6a, and the blue light emitted from the input device 6a in association with each other, stores the user account of the user B, the identification information about the input device 6b, and the red light emitted from the input device 6b in association with each other, and stores the user account of the user C, the identification information about the input device 6c, and the green light emitted from the input device 6c in association with each other.

The game progress section 112 executes the game program to let a game progress. Based on the operation information inputted to the input devices 6a, 6b, and 6c from the users A, B, and C, respectively, the game progress section 112 performs arithmetic processing in order to move a game object in a three-dimensional virtual space. The game progress section 112 may be the game program itself, and generates game image data by using, for example, the GPU. In this sense, the game progress section 112 functions as a game image generation section that generates a game image during a play. The display processing section 160 outputs a game image from the output device 4. The sharing processing section 162 encodes the game image data and distributes the encoded game image data as a distribution image.

Figure 5:
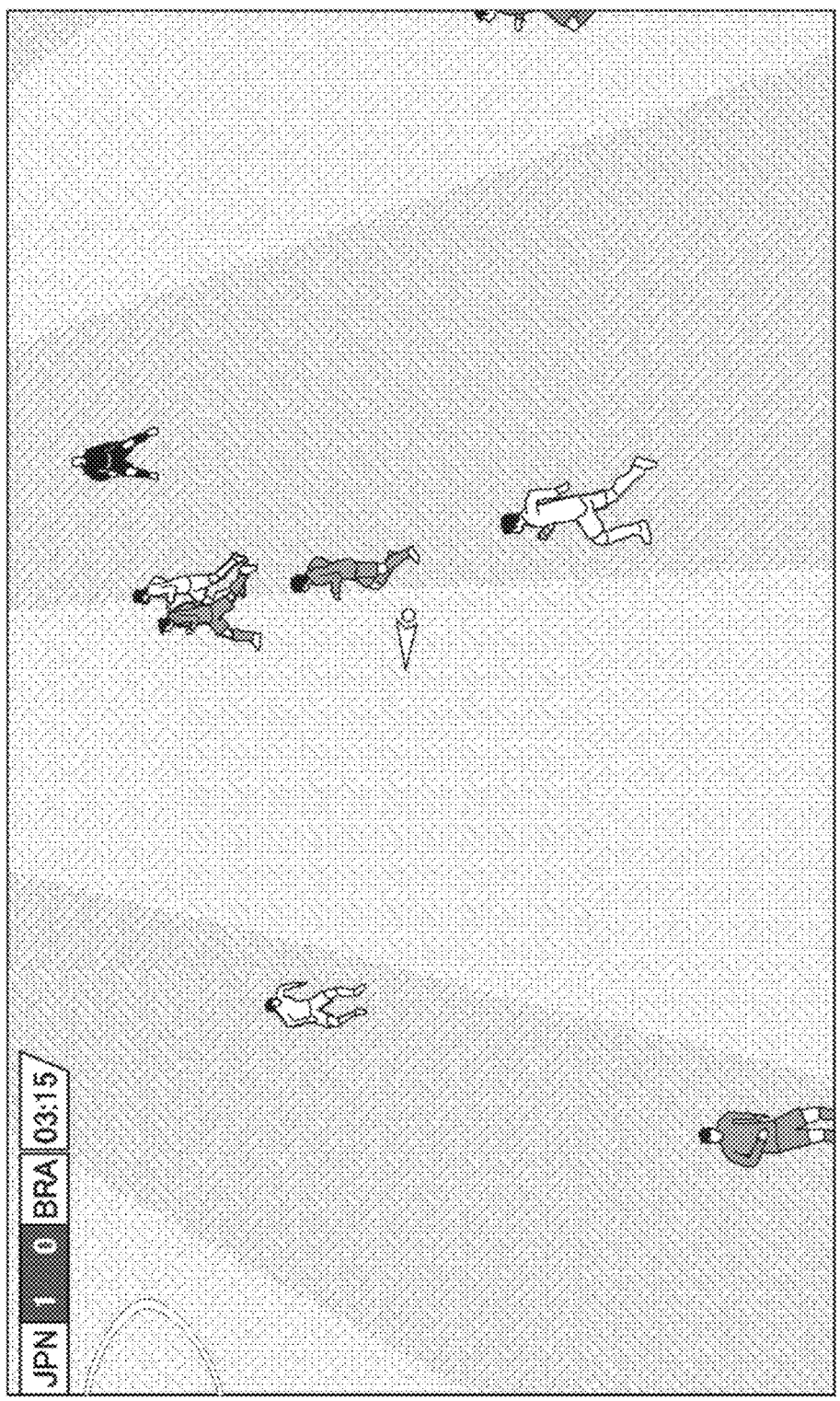
FIG. 5 is a diagram illustrating an example of a displayed game screen.

FIG. 5 illustrates an example of a game screen displayed on the output device 4. The example indicates that the users A to C are enjoying a soccer game together by manipulating soccer players. Each user selects a soccer player. Setup may be performed so that the selected player cannot be changed during a game or can be changed during a game by pressing a predetermined button on the input device 6. The sharing processing section 162 distributes, to the terminal devices 9, the same screens as the game screens viewed by the users A to C. When distributing a replay image that is included in a game image to reproduce at least a past play status, the information processing device 10 distributes a user image obtained by imaging a user, together with the replay image.

The game progress section 112 allows a game to progress on the basis of the operation information inputted to the input devices 6a to 6c. In this instance, the replay data generation section 114 generates replay data that reproduces the play status of a game. The replay data includes at least the operation information from the input devices 6a to 6c, which is to be received by the game program. During a game, the game program processes the operation information at a timing at which an input device 6 is operated. However, timing information about a timing of operation information input is also required to reproduce a past play status. Thus, the replay data generation section 114 generates replay data while the game program is executed by the game progress section 112. The generated replay data is obtained by associating the operation information inputted from the input devices 6a to 6c by the users A to C with timing data about a timing of operation information reception.

The timing data is generated, for example, as time information indicative of elapsed time from a reference timing, such as the start of game program execution, or as a frame number of a game image. That is to say, the replay data is obtained by associating an operation timing with operation information from the input device 6, which was used by the game progress section 112 for game progress. A previously played game scene can be reproduced because the game program receives the operation information at a pseudo operation timing included in the replay data when a replay image is generated. In the embodiment, the replay data generation section 114 generates replay data about a period between the start and end of a user's game play and stores the generated replay data in a replay data retention section 166. The operation information is additionally associated with information that specifies an input device 6 from which the operation information was inputted. More specifically, the operation information is associated with identification information about the input device 6 from which the operation information was inputted.

Further, the replay data generation section 114 generates event data and stores the generated event data in the replay data retention section 166. The generated event data includes the description of an event and timing data that were generated during game program execution by the game progress section 112. The replay data generation section 114 may generate event data at a timing of event generation detection during a game play or search the replay data for an event and generate event data at a timing of termination of a game play or a stage of a game. In this instance, the replay data generation section 114 stores, as replay data, event generation information indicative of the generation of an event and timing data in the replay data retention section 166. The replay data generation section 114 then searches the event generation information and generates event data. As for a soccer game, for example, an event is set for a game scene that excites the users, such as a goal event in which a score is made or a super save event in which a super save is achieved by a goalkeeper.

Further, events are not limited to those set in the game program and may be set depending on external circumstances. When, for instance, a voice equal to or louder than a predetermined level is inputted from a microphone (not illustrated), the replay data generation section 114 generates event data, which is obtained by associating the emission of a loud voice with timing data about the timing of voice emission, and stores the generated event data in the replay data retention section 166. Further, when, for example, a user photographed by the camera 7 jumps, the replay data generation section 114 generates event data, which is obtained by associating the excited user with timing data about the timing of user's excitement, and stores the generated event data in the replay data retention section 166.

Here, the fact that a voice equal to or louder than the predetermined level is inputted from a microphone or a user photographed by the camera 7 has moved in a predetermined manner is detected by the system software. Upon detection of the occurrence of such an event, the system software notifies the replay data generation section 114 of such an event. Upon receipt of such a notification from the system software, the replay data generation section 114 generates event data associated with timing data and stores the generated event data in the replay data retention section 166.

Furthermore, events may be set depending on the operation status of the input device 6. When, for example, a button or a key on the input device 6 is pressed repeatedly in rapid succession or more operations are performed within a short period of time than under normal conditions, the replay data generation section 114 generates event data that is obtained by associating such a repeated press in rapid succession with timing data about such a repeated press, and then stores the generated event data in the replay data retention section 166. During a fighting game, for example, a deadly blow can be delivered by pressing a plurality of different buttons in succession. When a plurality of different buttons are pressed in succession within a short period of time, the replay data generation section 114 may generate event data that is obtained by associating such a successive press of different buttons with timing data about such a successive press, and then store the generated event data in the replay data retention section 166. When a deadly blow defined as an event is delivered during a game, the replay data generation section 114 can detect the occurrence of the event. However, even if a deadly blow cannot be delivered due to an improper successive press of different buttons, such a successive press of different buttons may be recognized as an event in which an attempt to deliver a deadly blow failed, thereby allowing the replay data generation section 114 to generate event data.

The captured image acquisition section 140 acquires captured image data from the camera 7. For example, the camera 7 captures an image of a space periodically (for example, at 1/60 second intervals), and supplies the captured images to the captured image acquisition section 140 through the USB module 34. The captured image acquisition section 140 associates the acquired captured image data with timing data indicative of the timing of image capture and stores the resulting captured image data in a captured image data retention section 168. The timing data may be time information indicative of time elapsed from a reference timing or a frame number of a game image as counted from the reference timing. The frame number corresponds to the number of image frames generated since the reference timing. The frame number of a game image is 1 when it is generated at the reference timing. Subsequently, the frame number is incremented by one upon each generation of a game image.

The replay data retained in the replay data retention section 166 and the captured image data retained in the captured image data retention section 168 include respective timing data. As mentioned earlier, the timing data is set with reference to a certain timing. For example, the reference timing may be a timing at which the game program starts or a timing at which a user starts playing. When a frame image of a game is generated at 1/30 second intervals and a captured image is acquired from the camera 7 at 1/60 second intervals, the captured image acquisition section 140 may store, in the captured image data retention section 168, one out of two successive captured images, that is, an image captured at 1/30 second intervals. The generation cycle of a game frame image is not in exact synchronism with the image capture cycle of the camera 7. However, the frame numbers of game images can be made the same as those of captured images by allowing the captured image acquisition section 140 to assign the same frame number to a game image and to a captured image acquired immediately after the game image. Upon receipt of a notification of the reference timing from the program execution section 110, the captured image acquisition section 140 attaches timing data indicative of frame number 1 to a captured image acquired immediately after the notification of the reference timing, and stores the resulting combination in the captured image data retention section 168. Subsequently, the captured image acquisition section 140 excludes one out of two successive captured images, increments the frame number of a captured image by one at a time, and stores the captured image in the captured image data retention section 168.

When the frame number of operation information included in the replay data is "N," it signifies that the operation information is reflected in the Nth game image generated since the reference timing. Further, when the frame number included in captured image data is "N," it signifies that the captured image data is the Nth captured image data stored in the captured image data retention section 168 since the reference timing.

Figure 6:
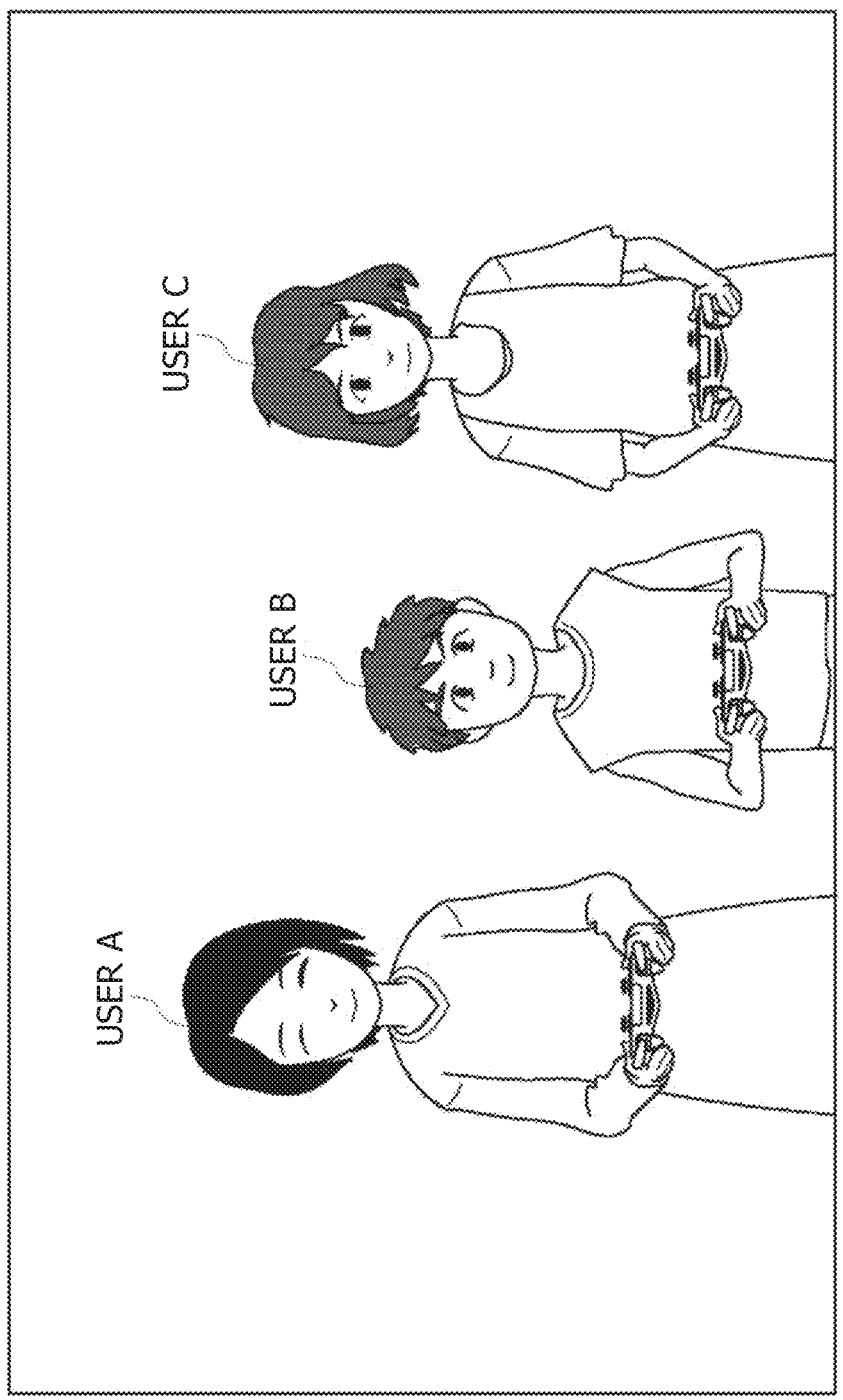
FIG. 6 is a diagram illustrating an example of a space photographed by a camera.

FIG. 6 illustrates an example of a space photographed by the camera 7. There are three users A to C in the photographed space. A quadrangular frame surrounding the three users in FIG. 6 represents an imaging range (angle of view) of the camera 7. The captured image acquisition section 140 acquires captured image data from the camera 7. For example, the camera 7 captures an image of the space at 1/60 second intervals and supplies the captured image to the captured image acquisition section 140 through the USB module 34. As described earlier, the captured image acquisition section 140 attaches a frame number, which serves as timing data, to the captured image and stores the captured image in the captured image data retention section 168 at a timing matching the frame rate of a game image (if necessary, by excluding some image frames).

A face recognition process of the information processing device 10 will now be described.

The face recognition section 156 has a function of detecting a user's face image in a captured image. The face recognition section 156 detects a portion looking like a human face, extracts such a portion from the captured image, derives feature amount data from the extracted portion, compares the feature amount data with face identification data retained in the registered user information retention section 170, and determines whether or not the extracted face is the face of a registered user.

More specifically, the face recognition section 156 derives the degree of coincidence between the feature amount data on the extracted face image of a user and face identification data on all registered users, which is retained in the registered user information retention section 170. The degree of coincidence is numerically expressed. The degree of coincidence is derived so that it is expressed, for example, by the number of points out of 100 points. If the degree of coincidence with the feature amount data on a registered face image is higher than 90 points, the face recognition section 156 determines that a photographed user is a registered user, and specifies the registered user who matches the photographed user. If the degree of coincidence is higher than 90 points in a plurality of registered users, the face recognition section 156 may determine that the photographed user is a registered user whose face identification data exhibits the highest point. If the derived degree of coincidence between the feature amount data on a user's face image extracted from the captured image and the face identification data on all registered users is not higher than 90 points, the face recognition section 156 determines that the user included in the captured image is not a user having a registered face image. As described above, the face recognition section 156 detects the face image of a registered user existing in the captured image by using the face identification data retained in the registered user information retention section 170. A well-known face identification technology may be used in the above-described face identification process.

A replay processing function of the game program will now be described.

As for a soccer game, a replay image of, for example, a goal scene is generated at the end of a match. A highlight scene, such as a goal scene, is defined based an event detected during a game. Depending on external circumstances, the highlight scene may be defined upon detection of the excitement of the users A to C.

In the replay processing section 120, the replay data acquisition section 122 acquires replay data and event data that are retained in the replay data retention section 166. The scene determination section 124 references the acquired event data to determine a game scene that is to be edited as a highlight scene. The event data includes the description of an event and timing data about the occurrence of the event. However, the period of the scene to be edited may be defined depending on the description of the event. As regards a goal event, for example, a 5-second period before a ball enters a goal and a 5-second period after the ball entered the goal are defined as a scene period of a replay image. A process of generating a replay image of a goal event is described below.

The scene determination section 124 references the timing data included in the event data on a goal scene, and specifies a scene start frame number and a scene end frame number. The scene start frame number corresponds to a timing that is five seconds before the occurrence of an event. The scene end frame number corresponds to a timing that is five seconds after the occurrence of the event. The replay image generation section 126 receives the scene start frame number and the scene end frame number from the scene determination section 124, and generates a replay image of the goal scene.

More specifically, the replay image generation section 126 executes the game program and generates a replay image on the assumption that operation information included in the replay data is inputted from the input devices 6a to 6c at a timing specified by timing data associated with the operation information. As described above, the replay image generation section 126 supplies the replay data, as pseudo operation information, to the game program and generates a game image for moving soccer players within a three-dimensional virtual space.

The replay image generation section 126 may generate a replay image by using the viewpoint and line-of-sight of a virtual camera during a game play period. However, the viewpoint and line-of-sight of the virtual camera may be changed to generate the replay image. Further, the replay image generation section 126 may generate a plurality of replay images from a plurality of viewpoints and lines-of-sight of the virtual camera so that a goal scene can be viewed from various angles. As regards a goal scene, for example, the replay image generation section 126 generates a first replay image, a second replay image, and a third replay image. The first replay image is an image obtained as viewed from a distance (an image identical with or close to a play image). The second replay image is an image obtained when focus is placed on the movement of a player who has made a successful shoot. The third replay image is an image obtained as viewed from behind the goal. These three different replay images are generated by varying the viewpoint and line-of-sight of the virtual camera.

The user determination section 128 determines a user to be included in a combined image. The combined image is obtained by combining a replay image, which is generated by the replay image generation section 126, with a user image, which is cut out from a captured image. The user determination section 128 references the replay data and determines the user on the basis of play status in a game scene. More specifically, the user determination section 128 determines, as the user to be included in the combined image, a user who has manipulated a game object (soccer player) involved in a goal event of a goal scene.

An event information retention section 172 retains object information for determining a user to be included in a captured image that is to be added to the replay image of an event. Further, the event information retention section 172 also retains type information for specifying the cut-out form into which the user image is cut out from the captured image. The object information and the type information are associated with the replay image. The event information retention section 172 may retain these items of event information in a tabular form or in a comma-separated value CSV format. A file in which the event information is recorded is included in the game software, read by the auxiliary storage device 2 when the game program starts, and used for a user determination process performed by the user determination section 128.

FIG. 7 illustrates an example of the event information about a goal event. As described earlier, the replay image generation section 126 generates the first to third replay images for the goal event. The "REPLAY IMAGE" field contains information for specifying a replay image. The number "1" in the replay image field represents the first replay image. The number "2" in the replay image field represents the second replay image. The number "3" in the replay image field represents the third replay image.

The "GAME OBJECT" field contains information that designates the user to be added to the replay image. More specifically, the information in this field is used to determine a user manipulating the associated game object as the user to be included in the combined image. Here, the game object for the first replay image and for the second replay image is a "PLAYER WHO HAS MADE A SHOOT." Therefore, the user determination section 128 determines that a captured image including a user manipulating a player who has made a shoot is to be added to the first replay image and to the second replay image. Further, as the game object for the third replay image is a "GOALKEEPER," the user determination section 128 determines that a captured image including a user manipulating a goalkeeper is to be added to the third replay image. As described above, the user determination section 128 determines that a user manipulating a game object (soccer player) associated with a replay image of a game scene is to be included in the combined image. In a goal scene, the embodiment assumes that a player who has made a shoot is manipulated by the user A, and that a goalkeeper is manipulated by the user C.

The "TYPE INFORMATION" field specifies the cut-out form into which a user image is cut out from a captured image.

Figure 8:
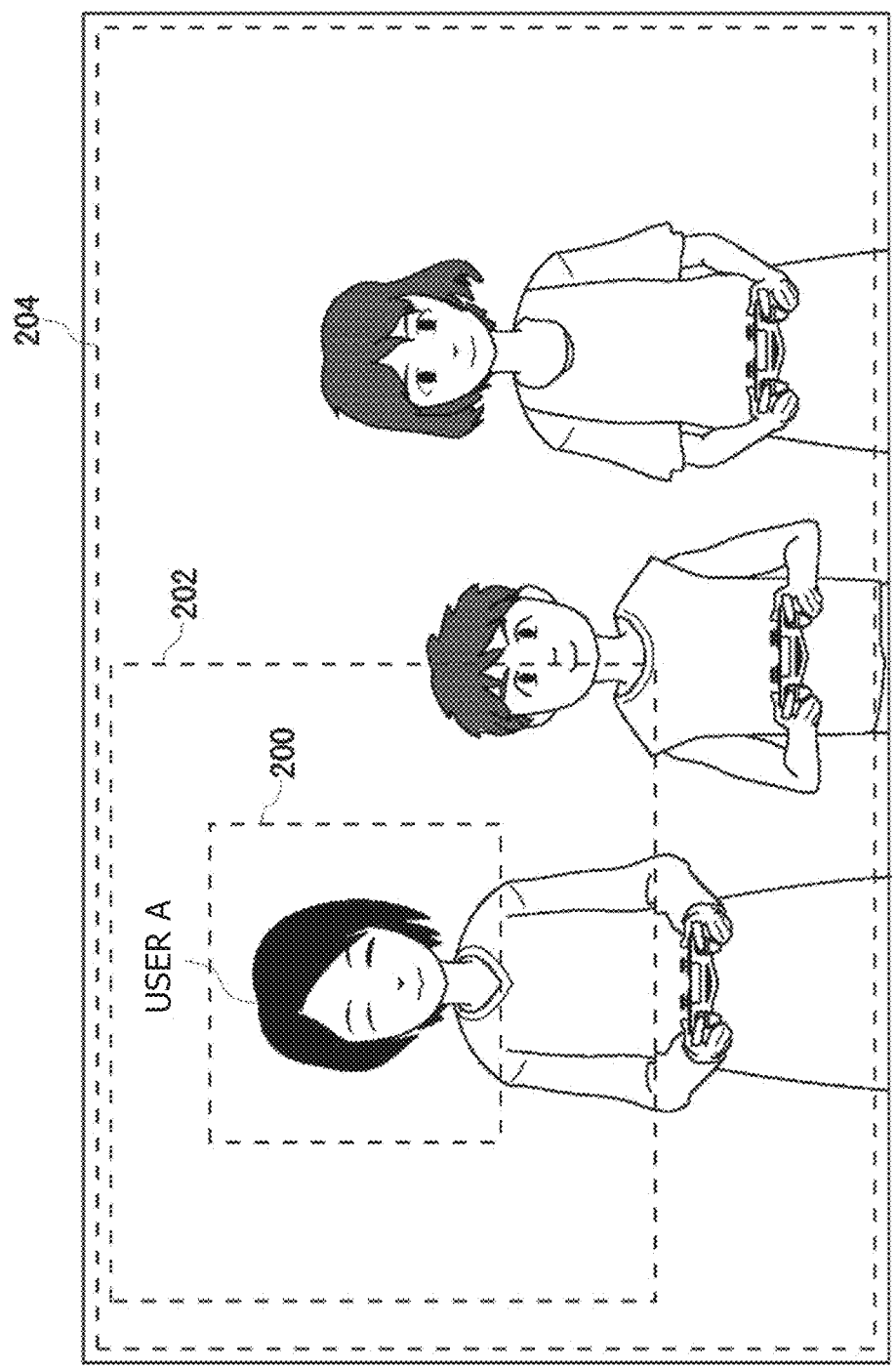
FIG. 8 is a diagram illustrating a cut-out form based on type information.

FIG. 8 is a diagram illustrating the cut-out form based on the type information. The embodiment provides three different cut-out forms into which a user is cut from a captured image. FIG. 8 illustrates an example in which the user A is cut out. A cut-out area 200 is based on type 1. A cut-out area 202 is based on type 2. A cut-out area 204 is based on type 3. These cut-out areas 200, 202, and 204 are set so that they include at least a face image of the user determined by the user determination section 128. However, the proportion of the face image in the area decreases with an increase in the type number.

The cut-out area 200 for type 1 is set so as to increase the proportion of the user's face image. A captured image cut out from the cut-out area 200 displays a large face of a playing user when combined with a replay image. Therefore, the facial expression of the playing user is clearly visible to a viewing user.

The cut-out area 202 for type 2 is set so as to cut out an upper body of a user. A captured image cut out from the cut-out area 202 displays the upper body of a playing user when combined with a replay image. Therefore, a viewing user can see the excitement indicated by the movement of the playing user.

The cut-out area 204 for type 3 is set so as to cut out the captured image entirely. The cut-out area 204 may be the captured image itself. Particularly, when there are a plurality of playing users, the captured image cut out from the cut-out area 204 displays the plurality of playing users when combined with a replay image. Therefore, a viewing user can sense the mood of the play.

As illustrated in FIG. 7, the type information about the cut-out area is set for a replay image as event information. When generating the event information, a game maker determines which user's captured image is to be combined with the replay image to be generated, and what part of the captured image is to be cut out. As mentioned above, the cut-out areas for types 1 to 3 have their own characteristics. Thus, the game maker determines a cut-out area appropriate for the replay image to be edited.

Referring to the event information illustrated in FIG. 7, a "PLAYER WHO HAS MADE A SHOOT," which is a game object, and type information 2 are associated with the first replay image, which is obtained as viewed from a distance, and with the second replay image, which is obtained when focus is placed on a player who has made a successful shoot. A user manipulating the player who has made a successful shoot is likely to become excited and overcome with joy. Thus, type information 2 is selected for such a game object because the excitement of such a game object is likely to be indicated by type information 2. Meanwhile, a "GOALKEEPER," which is a game object, and type information 3 are associated with the third replay image, which is obtained as viewed from behind the goal. It is conceivable that a user manipulating a goalkeeper is discouraged. Thus, when type information 1 is selected to display a large image displaying a facial expression indicative of discouragement, a discouraged mood can be effectively expressed. This kind of policy may be selected as appropriate by the game maker. When the cut-out form is varied based on a replay image of one highlight scene, a viewing user becomes interested in such rendition. As a result, the game program will enjoy great popularity.

The image generation section 150 has a library that is used to cut out part of a captured image on the basis of the type information. When the contents of the library are released to the game maker, the game maker can devise various effective renditions to generate event information. The type information is not limited to the information on three different types. The type information may be the information on one or two types or the information on four or more types. The replay processing section 120 can receive cut-out user images from the image generation section 150 simply by designating the user and type information.

The cut-out area for the user A has been described with reference to FIG. 8. However, cut-out areas for the users B and C are also set to include the face images of the users B and C.

The user determination section 128 references the event information illustrated in FIG. 7 and determines, from the replay data on a goal scene, the user whose image is to be cut out from a captured image. The operation information included in the replay data is associated with identification information about an input device 6 from which the operation information was inputted. Thus, the user determination section 128 specifies the input device 6 that has manipulated a game object. Here, the user determination section 128 specifies that the input device 6a has manipulated a player who has made a shoot, references the contents stored in the logged-in user storage section 174, and determines that the input device 6a is used by the user A. Further, the user determination section 128 identifies that the input device 6c has manipulated a goalkeeper, references the contents stored in the logged-in user storage section 174, and determines that the input device 6c is used by the user C. In this manner, the user determination section 128 determines that the user image to be added to the first and second replay images is an image of the user A, and that the user image to be added to the third replay images is an image of the user C. The user determination section 128 notifies the user image request section 130 of a user account of the user determined as a cut-out target and the type information about the captured image. Meanwhile, the scene determination section 124 notifies the user image request section 130 of the scene start frame number and the scene end frame number.

Upon receipt of the notification, the user image request section 130 designates the scene start frame number, the scene end frame number, the user account of the user, and the type information about the captured image, and transmits, to the image generation section 150, a user image generation request in order to request the supply of a user image. The scene start frame number and the scene end frame number designate the period of a goal scene within a goal event. The user image generation request is transmitted to request the supply of a type 2 image of the user A in the goal scene and the supply of a type 1 image of the user C in the goal scene.

In the image generation section 150, the request reception section 152 receives the user image generation request. Based on the scene start frame number and scene end frame number included in the user image generation request, the captured image read section 154 reads, from the captured image data retention section 168, a 10-second captured image between the scene start frame number and the scene end frame number. The face recognition section 156 performs a user recognition process on the read captured image.

Figure 9:
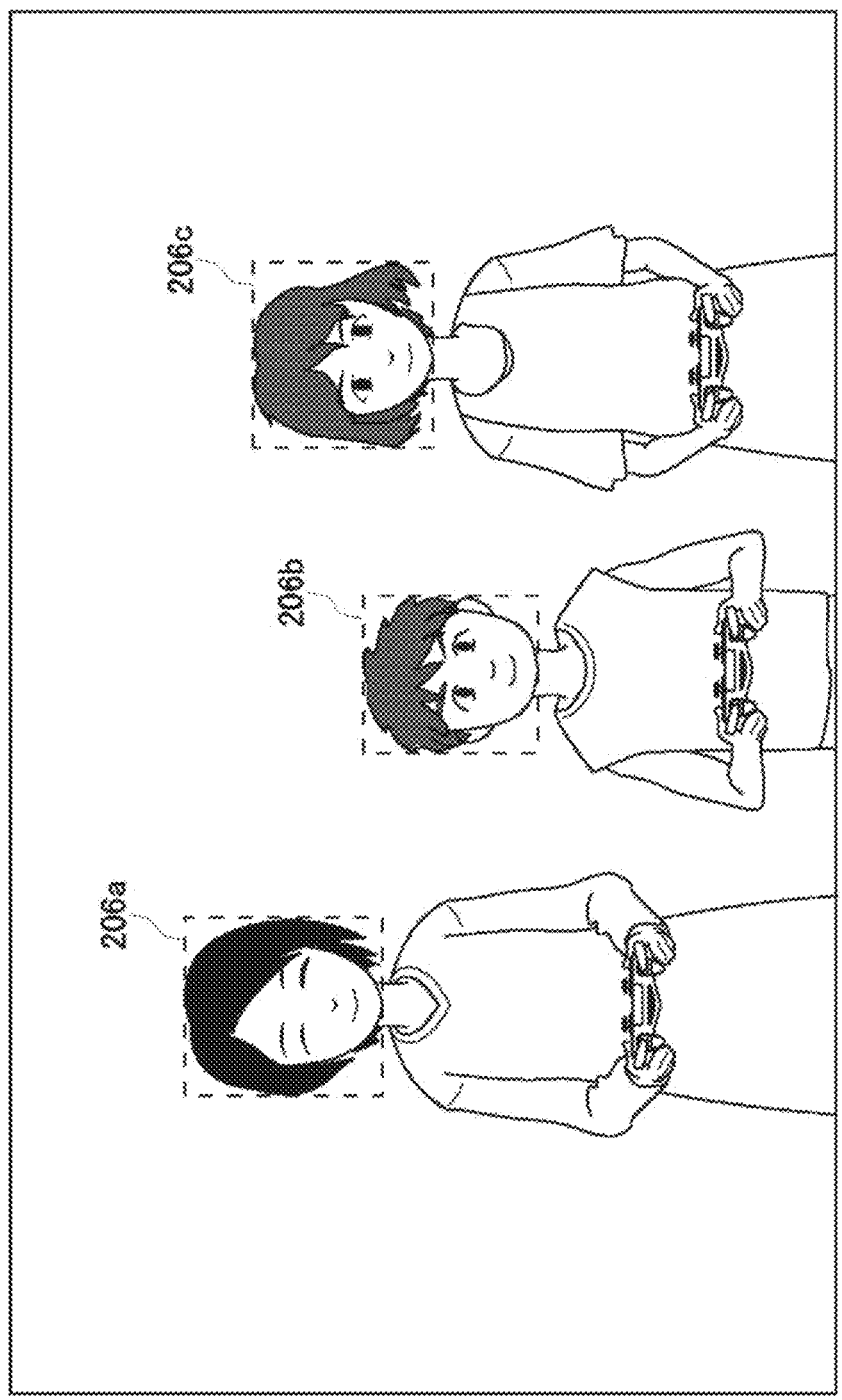
FIG. 9 is a diagram illustrating the result of face identification by a face recognition section.

FIG. 9 illustrates the result of face identification by the face recognition section 156. If, for example, a camera image in FIG. 6 indicates a goal scene, it is determined that the left user is the user A, and that the central user is the user B, and further that the right user is the user C. The face recognition section 156 uses coordinates within the camera image to set a face area 206a, a face area 206b, and a face area 206c. The face area 206a indicates the position of the face of the user A in a captured image. The face area 206b indicates the position of the face of the user B in the captured image. The face area 206c indicates the position of the face of the user C in the captured image. Each face area 206 may be set as a rectangular area that circumscribes the face image of a user.

Figure 10:
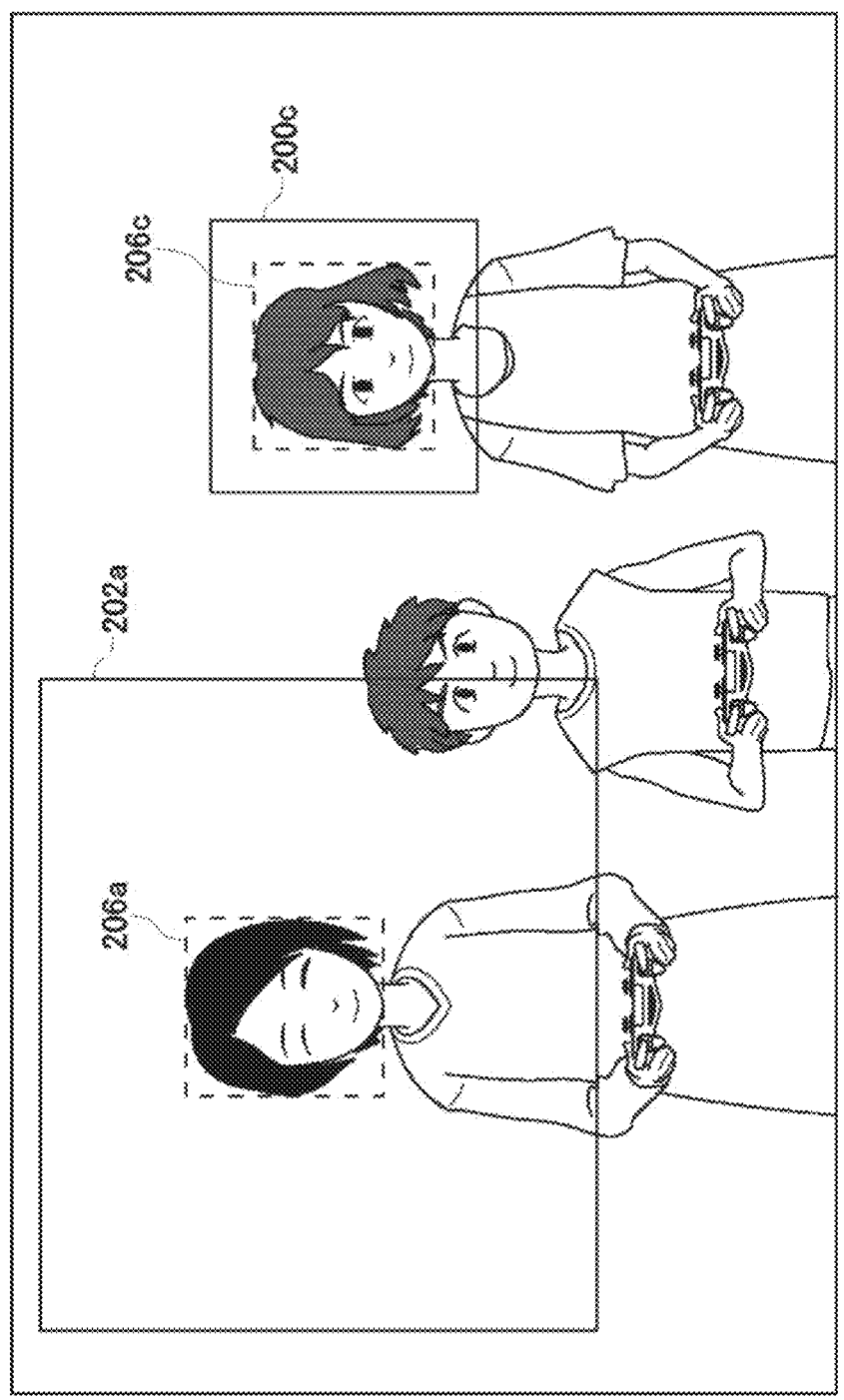
FIG. 10 is a diagram illustrating cut-out areas that are set based on the result of face identification.

FIG. 10 illustrates cut-out areas that are set based on the result of face identification. Based on the face area 206a of the user A, which is set by the face recognition section 156, the user image generation section 158 defines a type 2 cut-out area 202a of the user A. Further, based on the face area 206c of the user C, the user image generation section 158 defines a type 1 cut-out area 200c of the user C.

The user image generation section 158 cuts out, from the captured image, the cut-out area 202a, which includes the face image of the user A in a goal scene, and supplies the cut-out area 202a to the replay processing section 120. Further, the user image generation section 158 cuts out, from the captured image, the cut-out area 200c, which includes the face image of the user C in the goal scene, and supplies the cut-out area 200c to the replay processing section 120. The user image acquisition section 132 acquires a designated type 2 captured image of the user A and a designated type 1 captured image of the user C.

The above description states that the user image generation section 158 defines the cut-out area of a user by using the result of face identification by the face recognition section 156. However, an alternative is to have the object recognition section 157 detect an input device 6 in a captured image and let the user image generation section 158 define the cut-out area of the user by using the result of detection.

The object recognition section 157 searches a captured image for an input device 6. As a currently used input device 6 emits light of a predetermined color, the object recognition section 157 searches the captured image for a rectangular area of a predetermined color, that is, an area that emits light having the shape of the light emitting portion 85. As the user image generation request transmitted from the user image request section 130 requests the user images of the users A and C, the object recognition section 157 references the contents stored in the logged-in user storage section 174, and searches for a rectangular area of a blue color, which is the color of light emitted from the input device 6a of the user A, and for a rectangular area of a green color, which is the color of light emitted from the input device 6c of the user C. The object recognition section 157 supplies, to the user image generation section 158, the color of a detected illuminating rectangular area and the position coordinates of the rectangular area. In the present example, the face recognition section 156 does not need to perform face identification to specify the users. However, the face recognition section 156 detects the presence of face images and supplies detected position coordinates (i.e., the position coordinates of the face areas 206) to the user image generation section 158.

The user image generation section 158 references the contents stored in the logged-in user storage section 174, and determines that a detected user positioned higher than the position coordinates of the blue rectangular area is the user A. Further, the user image generation section 158 references the contents stored in the logged-in user storage section 174, and determines that a detected user positioned higher than the position coordinates of the green rectangular area is the user C. Accordingly, the user image generation section 158 may define the type 2 cut-out area 202a of the user A on the basis of the face area 206a and define the type 1 cut-out area 200c of the user C on the basis of the face area 206c of the user C.

The combination processing section 134 generates a combined image by combining a user image acquired by the user image acquisition section 132 with a replay image generated by the replay image generation section 126.

Figure 11:
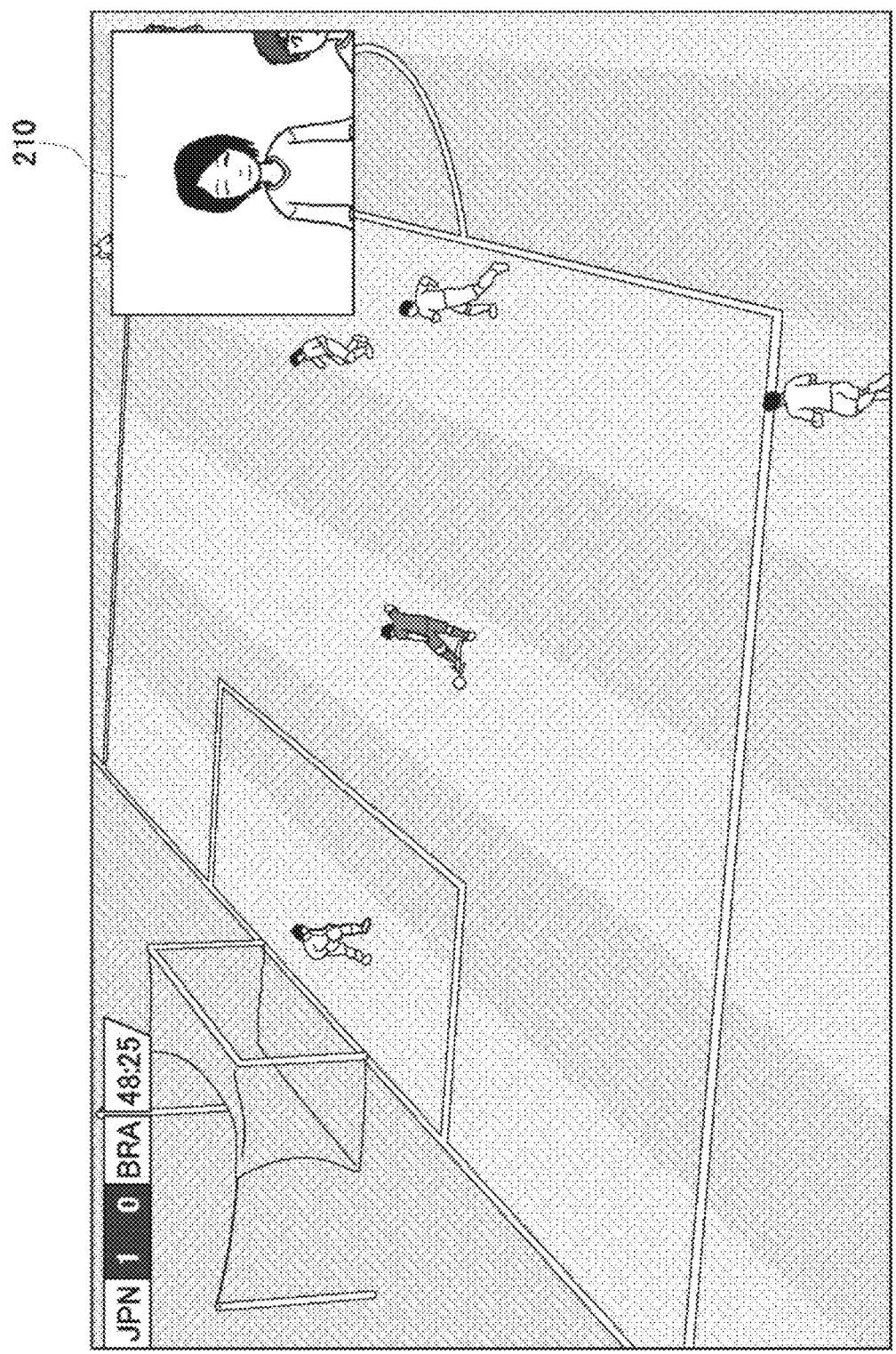
FIG. 11 is a diagram illustrating an example of a combined image.

FIG. 11 illustrates an example of the combined image. The combination processing section 134 displays a user image 210 over a partial area of the first replay image. The combination processing section 134 may superimpose the user image 210 over a predetermined area of the replay image such as an upper right corner of the replay image. When generating the replay image, the replay image generation section 126 may detect an area over which the user image can be superimposed without causing a problem, and notify the combination processing section 134 of the detected area. In a goal scene, the area over which the user image can be superimposed without causing a problem is an area through which a soccer ball does not pass. The replay image generation section 126 may check the upper right, lower right, lower left, and upper left corners of the replay image to detect an area through which the soccer ball does not pass, and notify the combination processing section 134 of the detected area. Upon receipt of the notification, the combination processing section 134 may define the area over which the user image is to be superimposed. Instead of superimposing the user image over the replay image, the combination processing section 134 may slightly reduce the size of the replay image and dispose the user image in an area vacated by such image size reduction. The combined image in FIG. 11 indicates a situation where a soccer player is about to make a shoot in a goal scene.

Figure 12:
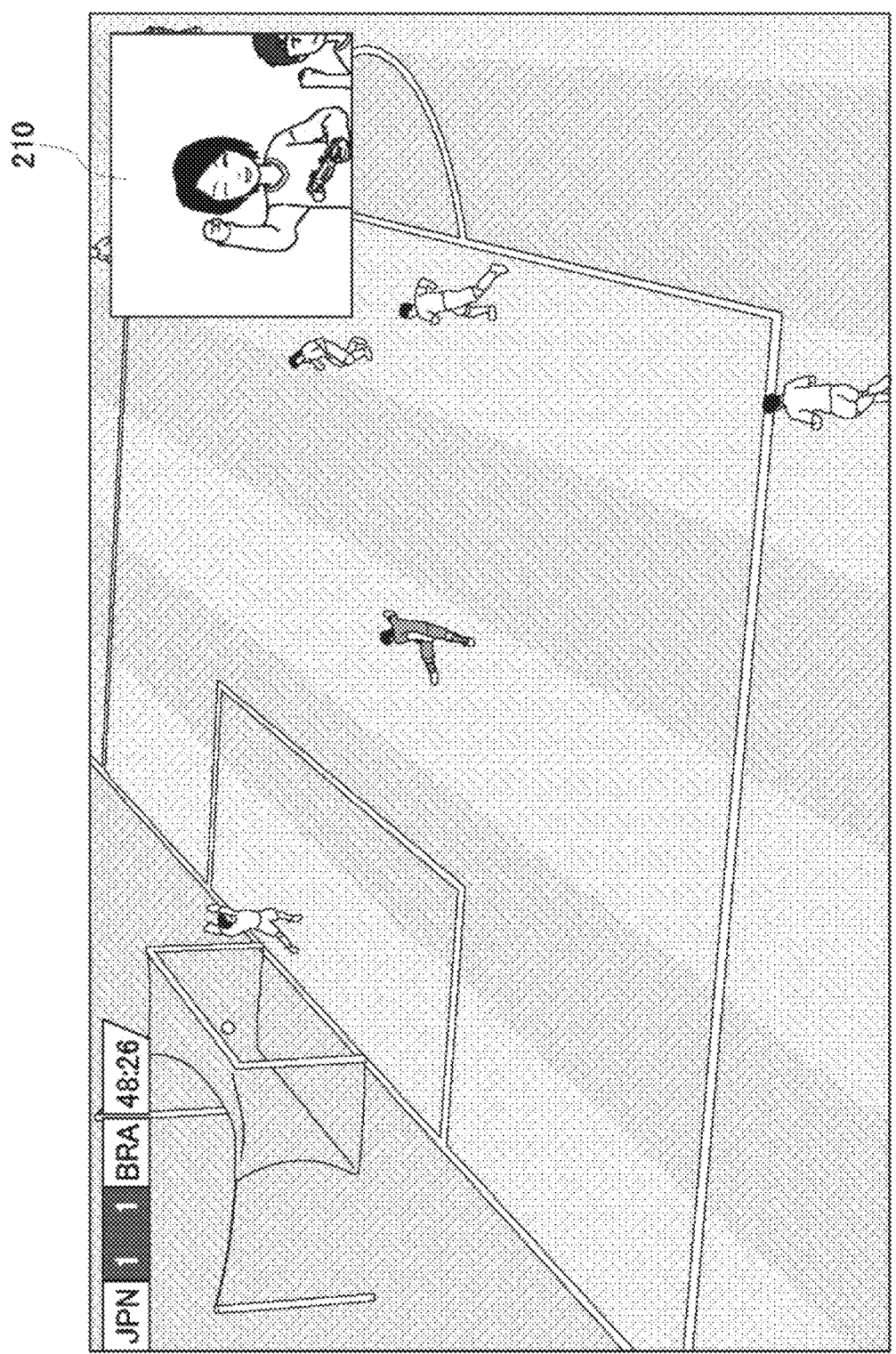
FIG. 12 is a diagram illustrating an example of a combined image.

FIG. 12 illustrates an example of the combined image. The combined image in FIG. 12 indicates a moment at which a successful shoot is made. The user image 210 indicates that the user A is delighted at the moment at which the successful shoot is made. When the replay image is combined with a user image indicating the state of a user as described above, the excitement of a user in a highlight scene can be conveyed to a viewing user.

Further, when a user image designated by the event information is selected, a captured image of a user appropriate for a highlight scene is added to the replay image. The examples of FIGS. 11 and 12 indicate a combined image that is obtained by combining the first replay image with an image of the user A. However, the combination processing section 134 additionally generates a combined image obtained by combining the second replay image with the image of the user A and a combined image obtained by combining the third replay image with an image of the user C, and the display processing section 160 causes the output device 4 to sequentially output the first replay image, the second replay image, and the third replay image in the order named.

In the embodiment, the user determination section 128 references the event information depicted in FIG. 7 and determines the user to be included in the combined image from the replay data on the goal scene. The user determination section 128 may determine the user to be included in the combined image on the basis of priority order of game objects associated with an event.

FIG. 13 illustrates priority information about a goal event. The priority information may be part of the event information and retained in the event information retention section 172. The priority information defines the priority order in which users to be included in the combined image are to be determined. In the example, a "PLAYER WHO HAS MADE A SHOOT" is given the first priority, a "PLAYER WHO HAS MADE AN ASSIST" is given the second priority, and a "GOALKEEPER" is given the third priority. The user determination section 128 may determine that a captured image including a user manipulating the first-priority player is to be added to the first replay image, and that a captured image including a user manipulating the second-priority player is to be added to the second replay image, and further that a captured image including a user manipulating the third-priority player is to be added to the third replay image. The priority information may include the type information, which specifies the cut-out form, in association with the priority order.

The event information depicted in FIG. 7 may be used in conjunction with the priority information depicted in FIG. 13. If the user cannot be determined based on the event information depicted in FIG. 7, the user determination section 128 may use the priority information depicted in FIG. 13 to determine the user to be included in the combined image.

The embodiment has been described above on the assumption that the user determination section 128 directly determines the user to be included in the combined image. However, the user determination process of the user determination section 128 may be performed to indirectly specify the user to be included in the combined image. The user determination section 128 specifies the input device 6 that is used by a user. However, once the input device 6 is specified, the user can be directly specified simply by referencing the logged-in user storage section 174. That is to say, the input device 6 and the user are in a one-to-one relationship. Therefore, the user determination section 128 indirectly determines the user to be included in the combined image by determining at least the input device 6 that has manipulated a game object. When the user image request section 130 transmits a user image generation request including the identification information about an input device 6 to the image generation section 150, the request reception section 152 may reference the contents stored in the logged-in user storage section 174 on the basis of the identification information about the input device 6 and specify the user.

The present invention has been described above in terms of an embodiment. The present embodiment is illustrative, and it is to be understood by those skilled in the art that combinations of constituent elements and processes of the embodiment are susceptible of various modifications, and that such modifications also fall within the scope of the present invention. For example, the combination processing section 134 may use only a user image as the reproduction image without combining the replay image with the user image. Further, when a combined image obtained by combining the replay image with the user image is to be displayed or distributed, the combined image may be displayed or distributed together with a combined image used for a previous game play.

The embodiment has been described on the assumption that the program execution section 110 executes the game program and implements the functions of the replay processing section 120. However, the system software may implement the functions of the user image acquisition section 132 and combination processing section 134, which have been described as the functions of the replay processing section 120.

Two different types of users may exist in an event. It is probable that a certain user has obtained a positive result from the event and that a certain other user has obtained a negative result from the event. As regards a goal event, for example, a user manipulating a player who has made a shoot and a user manipulating a player who has made an assist have obtained a positive result, whereas a user manipulating a goalkeeper who was unable to block a shoot has obtained a negative result. In the event information depicted in FIG. 7 and in the priority information depicted in FIG. 13, positive or negative attribute information may be assigned to a game object. Based on the attribute information assigned to the game objet, the user image generation section 158 may perform a predetermined process on a cut-out area cut out from a captured image. For example, the user image generation section 158 may set a background or a border for a cut-out area on the basis of the attribute information. For example, a color and texture indicative of delight may be applied to the background and/or border of a cut-out area for a user manipulating a game object to which a positive attribute is assigned. Meanwhile, a color and texture indicative of discouragement may be applied to the background and/or border of a cut-out area for a user manipulating a game object to which a negative attribute is assigned. The color and texture indicative of delight may be a bright color and a rich texture. The color and texture indicative of discouragement may be a dark color and a depressing texture. In this manner, the delight and discouragement of a user can be expressed not only by the movement and facial expression of the user but also by the background and border for the cut-out area for the user.

The embodiment has been described on the assumption that the replay processing section 120 generates a combined image after the end of a match. However, if, for example, the occurrence of an event is detected during a match, the replay processing section 120 may generate a combined image upon detection of the event.

Further, the embodiment has been described on the assumption that a game object and the type information about a cut-out area are set as event information for a replay image as illustrated in FIG. 7, and that the event information is generated by a game maker. The game object and the type information may be defined by a distributing user or by a viewing user. Furthermore, FIG. 13 illustrates the priority information for determining the user to be included in a combined image. However, the priority information may be defined by a distributing user or a viewing user without regard to an event.

Moreover, the embodiment has been described on the assumption that the reproduction image is edited by superimposing a user image over a replay image for reproducing a past play status. However, a play image may be generated by superimposing a user image over an image indicating the current play status. For example, the game program sets, as a preliminary event, a play that is highly likely to result in a goal. The preliminary event for a goal scene is set for a situation where a player dribbling a ball has entered a penalty area or a cross is sent toward the front of the goal. In this instance, the user determination section 128 may reference the event information set as the preliminary event, determine the user whose image is to be superimposed over the play image, and allow the combination processing section 134 to combine the play image with the user image. As described above, the replay processing section 120 is capable of adding a user image to the current play image.

In the above instance, the user determination section 128 may reference not only the event information about the preliminary event but also the event information described in conjunction with the embodiment, determine the user whose image is to be cut out from a captured image, and notify the user image request section 130 of the determined user. When the user image request section 130 transmits a user image generation request designating the user account of the user to the image generation section 150, the user image generation section 158 defines the cut-out area for the designated user, cuts out the defined cut-out area from a currently captured image, and supplies the cut-out image to the replay processing section 120. Thus, the combination processing section 134 may generate a combined image by combining the user image acquired by the user image acquisition section 132 with the play image of a game scene generated by the game progress section 112, and allow the sharing processing section 162 to perform live distribution of the combined image, which is obtained by combining a game image of a current play with the user image. A user determination method employed by the user determination section 128 may be the same as the method described in conjunction with the embodiment. A process of superimposing the user image over the play image is basically the same as the process of superimposing a user image over a replay image, which has been described in conjunction with the embodiment, except that the user image generation section 158 generates a user image by cutting it out from a captured image photographed live after the user is determined by the user determination section 128.

Figure 14:
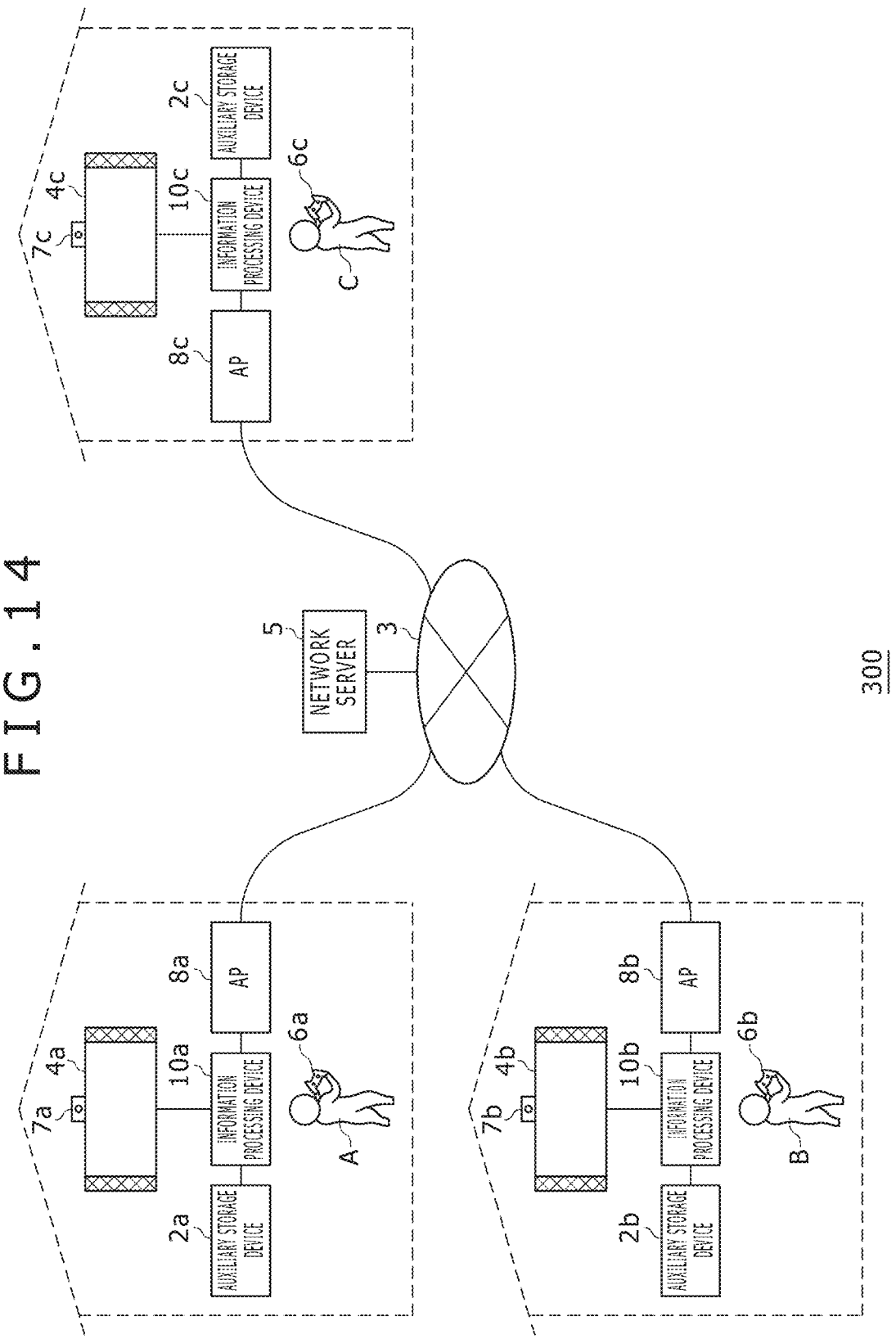
FIG. 14 is a diagram illustrating a modification of the information processing system.

FIG. 14 illustrates an example of a modification of the information processing system. An information processing system 300 includes information processing devices 10a, 10b, and 10c, which are operated by users, and a network server 5. The information processing devices 10a, 10b, and 10c and the network server 5 are connected to one another via a network 3 such as the Internet or a LAN. In this example, the user A operates the information processing device 10a, the user B operates the information processing device 10b, and the user C operates the information processing device 10c. The functions of the information processing devices 10a, 10b, and 10c are identical with or similar to the functions of the information processing device 10 described in conjunction with the embodiment.

In the information processing system 1 according to the embodiment, the users A to C operate the same information processing device 10 to play the game together. In the information processing system 300 according to the modification, however, the users A to C operate their respective information processing devices 10a to 10c to play the same soccer game together on-line.

The replay processing function in the above-described information processing system 300 will now be described.

Captured images of the users are stored in the captured image data retention section 168 in the respective auxiliary storage devices 2a to 2c. When, for example, the user A is to assume the role of a master, the user determination section 128 in the information processing device 10a determines the user to be included in a combined image of a highlight scene. If the determined user is the user A itself, the captured image of the user A is retained in the captured image data retention section 168 in the auxiliary storage device 2a. Thus, the image generation section 150 generates a user image of the user A and supplies the generated user image to the combination processing section 134.

Meanwhile, if the user determined by the user determination section 128 is a user (e.g., the user C) other than the user A, the captured image of the user C is retained in the captured image data retention section 168 in the auxiliary storage device 2c. Thus, the user image request section 130 transmits a user image generation request to the information processing device 10c of the user C. The transmitted user image generation request designates the scene start frame number and scene end frame number of a game scene, the network account of the user C, and the type information about the captured image.

Upon receipt of the user image generation request, the image generation section 150 in the information processing device 10c of the user C cuts out, based on the type information, a cut-out area from the captured image in such a manner as to include a face image of the user C between the start and end of a goal scene, and supplies the cut-out area to the information processing device 10a. This enables the replay processing section 120 in the information processing device 10a to generate a combined image by combining the user image of the user C with the replay image. The combined image generated in the information processing device 10a is distributed to the other game playing users, that is, the users B and C. Thus, the game playing users are able to view the combined image.

As the same game program is executed in the information processing devices 10a to 10c, the combined image may be generated in each of the information processing devices 10a to 10c. If the user to be included in the combined image of a highlight scene, which is determined by the user determination section 128 in each of the information processing devices 10a to 10c, is a user other than the local user, a combined image can be generated by combining the user image of the other user with the replay image when a user image generation request is transmitted to the information processing device 10 of the other user in order to receive a generated user image.

An external server may be assigned to perform a user image generation process by providing the external server with face identification data on the users A to C and supplying the captured images of the users A to C to the external server.

In the example of FIG. 14, too, the users may designate the type information and user identification information to be included in the user image generation request.

While the embodiment has been described with reference to a soccer game, it is obvious that the present invention is applicable to the other games. The events may be defined as appropriate for each game. For example, a certain event may be defined as the acquisition of a trophy, which is a virtual award won by a user, or as the achievement of a mission after a number of attempts of the user.

REFERENCE SIGNS LIST

1 . . . Information processing system, 10 . . . Information processing device, 100 . . . Processing section, 102 . . . Communication section, 104 . . . Reception section, 110 . . . Program execution section, 112 . . . Game progress section, 114 . . . Replay data generation section, 120 . . . Replay processing section, 122 . . . Replay data acquisition section, 124 . . . Scene determination section, 126 . . . Replay image generation section, 128 . . . User determination section, 130 . . . User image request section, 132 . . . User image acquisition section, 134 . . . Combination processing section, 140 . . . Captured image acquisition section, 150 . . . Image generation section, 152 . . . Request reception section, 154 . . . Captured image read section, 156 . . . Face recognition section, 157 . . . Object recognition section, 158 . . . User image generation section, 160 . . . Display processing section, 162 . . . Sharing processing section, 166 . . . Replay data retention section, 168 . . . Captured image data retention section, 170 . . . Registered user information retention section, 172 . . . Event information retention section, 174 . . . Logged-in user storage section, 300 . . . Information processing system

INDUSTRIAL APPLICABILITY

The present invention is applicable to technical fields in which a game scene is edited.

The invention claimed is:

1. A non-transitory, computer readable storage medium containing a computer program, which when executed by a computer, causes the computer to carry out actions, comprising:

by an image generation section, generating a game image of game progress during game play, the game progress progressing on the basis of operation information inputted to one or more user input devices;

by a replay data generation section, generating replay data during the game play by associating the operation information with operation timing data of the operation information, and generating event data during the game play, the event data including a description of an event and event timing data of the event, the event being captured by the game image;

by a scene determination section, referencing the event data to determine a game scene to be included in a combined image, the game scene including the event;

by a user determination section, determining a user to be included in the combined image by determining, as the user to be included in the combined image, a user who has manipulated a game object in the event, by matching the operation timing data to the event timing data to determine which operation information caused manipulation of the game object during the event, and determining which input device provided the manipulation operation information, and determining which user operated the providing input device;

by a captured image acquisition section, acquiring captured image data from a camera, the camera periodically capturing images of a real world space, the captured image data including the images of the real world space captured by the camera, and supplying the captured images to the captured image acquisition section; and associating the captured image data with captured image timing data; the real world space being a space in which the determined user is operating the input device during the event, the captured image data including an image of the user; the event timing data and the captured image timing data being set with reference to a reference timing such that frame identifiers of the game image are made substantially the same as frame identifiers of the captured images;

by a user image acquisition section, acquiring the user image from the captured image data by matching the event timing data to the captured image data and determining, using facial recognition to match a face of a user registered to the providing input device to a face in the captured image data, which area of the captured images includes the user image, and copying the user image from the determined area; and by a combination processing section, generating the combined image by combining the acquired user image with a replay game image including a replay of the game scene, such that the replay game image and the acquired user image are viewable simultaneously substantially in synchronization consistent with the simultaneous occurrences in real time of the event and the determined user playing through the event;

wherein determining the game scene includes determining the game scene based on detection of an emotional reaction to the game scene of a user participating in the game scene, the emotional reaction being detected by analysis of a movement of the participating user in the real world space, the captured image data including images of the movement; and wherein the acquired user image is combined with the replay game image such that the emotional reaction is conveyed to a viewing user viewing the combined image.

2. The program according to claim 1, wherein determining, as the user to be included in the combined image the user who has manipulated the game object in the event, determines the user on a basis of priority order of the game object associated with the event.

3. The program according to claim 1, further comprising:
by a user image request section, designating the determined user and type information about the user image and requesting a supply of the user image, wherein acquiring the user image includes acquiring the user image matching the designated type information.

4. The program according to claim 1, further comprising:
by a replay data acquisition section, acquiring the replay data for reproducing a play status of a game, wherein generating the game image includes, by a replay image generation section, generating the replay game image based on the acquired replay data.

5. An information processing device comprising:
an image generation section configured to generate a game image of game progress during game play, the game progress progressing on the basis of operation information inputted to one or more user input devices;

a replay data generation section configured to generate replay data during the game play by associating the operation information with operation timing data of the operation information, and generating event data during the game play, the event data including a description of an event and event timing data of the event, the event being captured by the game image;

a scene determination section configured to reference the event data to determine a game scene to be included in a combined image, the game scene including the event;

a user determination section configured to determine a user to be included in the combined image by determining, as the user to be included in the combined image, a user who has manipulated a game object in the event, by matching the operation timing data to the event timing data to determine which operation information caused manipulation of the game object during the event, and determining which input device provided the manipulation operation information, and determining which user operated the providing input device;

a captured image acquisition section configured to acquire captured image data from a camera, the camera periodically capturing images of a real world space, the captured image data including the images of the real world space captured by the camera, and configured to supply the captured images to the captured image acquisition section; and configured to associate the captured image data with captured image timing data; the real world space being a space in which the determined user is operating the input device during the event, the captured image data including an image of the user; the event timing data and the captured image timing data being set with reference to a reference timing such that frame identifiers of the game image are made substantially the same as frame identifiers of the captured images;

a user image acquisition section configured to acquire the user image from the captured image data by matching the event timing data to the captured image data and determining, using facial recognition to match a face of a user registered to the providing input device to a face in the captured image data, which area of the captured images includes the user image, and copying the user image from the determined area; and a combination processing section configured to generate the combined image by combining the acquired user image with a replay game image including a replay of the game scene, such that the replay game image and the acquired user image are viewable simultaneously substantially in synchronization consistent with the simultaneous occurrences in real time of the event and the determined user playing through the event;

wherein determining the game scene includes determining the game scene based on detection of an emotional reaction to the game scene of a user participating in the game scene;

wherein determining the user to be included in the combined image includes determining, as the user to be included in the combined image, a user who has manipulated a game object in an event in the game scene, the emotional reaction being detected by analysis of a movement of the participating user in the real world space, the captured image data including images of the movement; and wherein the acquired user image is combined with the replay game image such that the emotional reaction is conveyed to a viewing user viewing the combined image.

* * * * *